United States Patent
Okada et al.

(10) Patent No.: US 11,715,021 B2
(45) Date of Patent: Aug. 1, 2023

(54) VARIABLE EMBEDDING METHOD AND PROCESSING SYSTEM

(71) Applicants: DENSO CORPORATION, Kariya (JP); TOHOKU UNIVERSITY, Sendai (JP)

(72) Inventors: Shuntaro Okada, Kariya (JP); Masayoshi Terabe, Kariya (JP); Masayuki Ohzeki, Sendai (JP)

(73) Assignees: DENSO CORPORATION, Kariya (JP); TOHOKU UNIVERSITY, Sendai (JP)

( * ) Notice: Subject to any disclaimer, the term of this patent is extended or adjusted under 35 U.S.C. 154(b) by 1079 days.

(21) Appl. No.: 16/444,472

(22) Filed: Jun. 18, 2019

(65) Prior Publication Data

US 2019/0392326 A1    Dec. 26, 2019

(30) Foreign Application Priority Data

Jun. 20, 2018 (JP) .................................. 2018-117045
Mar. 26, 2019 (JP) .................................. 2019-058504

(51) Int. Cl.
*G06N 5/02* (2023.01)
*G06N 10/00* (2022.01)

(52) U.S. Cl.
CPC .............. *G06N 5/02* (2013.01); *G06N 10/00* (2019.01)

(58) Field of Classification Search
CPC ........ G06N 5/02; G06N 10/00; G06N 3/0445; G06N 3/0472; G06N 5/003
See application file for complete search history.

(56) References Cited

U.S. PATENT DOCUMENTS

| 8,266,697 B2 * | 9/2012 | Coffman | H04L 63/14 709/224 |
| 9,501,747 B2 | 11/2016 | Roy | |
| 2014/0250288 A1 * | 9/2014 | Roy | B82Y 10/00 712/223 |

(Continued)

OTHER PUBLICATIONS

Vicky Choi, Minor-Embedding in Adiabatic Quantum Computation: I. The Parameter Setting Problem, Apr. 30, 2008, D-Wave Systems Inc., 17 pages (Year: 2008).*

(Continued)

*Primary Examiner* — Omar F Fernandez Rivas
*Assistant Examiner* — Tri T Nguyen
(74) *Attorney, Agent, or Firm* — Posz Law Group, PLC

(57) ABSTRACT

A variable embedding method, for solving a large-scale problem using dedicated hardware by dividing variables of a problem graph into partial problems and by repeating an optimization process of the partial problems when an interaction of the variables of an optimization problem is expressed in the problem graph, includes: determining whether a duplicate allocation of the variables of the optimization problem to the vertices of the hardware graph is required when embedding at least a part of all the variables into the vertices of the hardware graph; and selecting one of the variables requiring no duplicate allocation and embedding selected variable in one of the vertices of the hardware graph without using another one of the variables requiring the duplicate allocation as one of the variables of the partial problem.

22 Claims, 22 Drawing Sheets

(56) References Cited

U.S. PATENT DOCUMENTS

2014/0324933 A1* 10/2014 Macready ............. G06N 5/003
                                                      708/200
2015/0006443 A1   1/2015 Rose et al.
2016/0335558 A1* 11/2016 Bunyk ................... G06N 10/00
2017/0255629 A1   9/2017 Thom et al.
2018/0137083 A1*  5/2018 Aramon ................. G06F 17/11
2019/0087388 A1*  3/2019 Venturelli ............. G06N 5/003

OTHER PUBLICATIONS

Hayato Ushijima-Mwesigwa et al., Graph Partitioning using Quantum Annealing on the D-Wave System, Nov. 2017, 8 pages (Year: 2017).*

Booth et al., "Partitioning Optimization Problems for Hybrid Classical/Quantum Execution," D-Wave Technical Report Series, 14-1006A-A, Jan. 9, 2017, D-Wave Systems Inc.

Cai et al., "A practical heuristic for finding graph minors," Jun. 12, 2014, pp. 1-16, D-Wave Systems Inc.

Hamilton et al., "Identifying the minor set cover of dense connected bipartite graphs via random matching edge sets," Dec. 21, 2016, pp. 1-9, Quantum Computing Institute, Oak Ridge National Laboratory, Tennessee, 37821, USA.

* cited by examiner

FIG. 2
<OPTIMIZATION PROBLEM ORIGINAL PROBLEM>  <PARTIAL PROBLEM $x_n$>
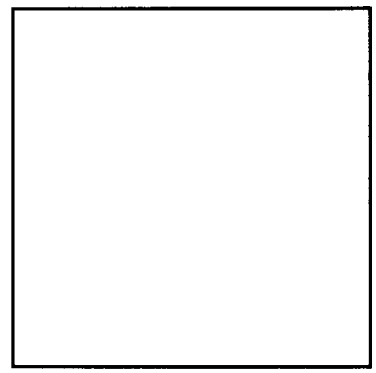 DIVISION 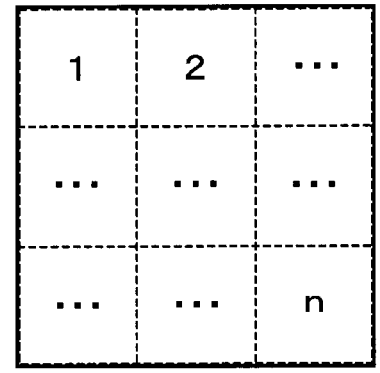

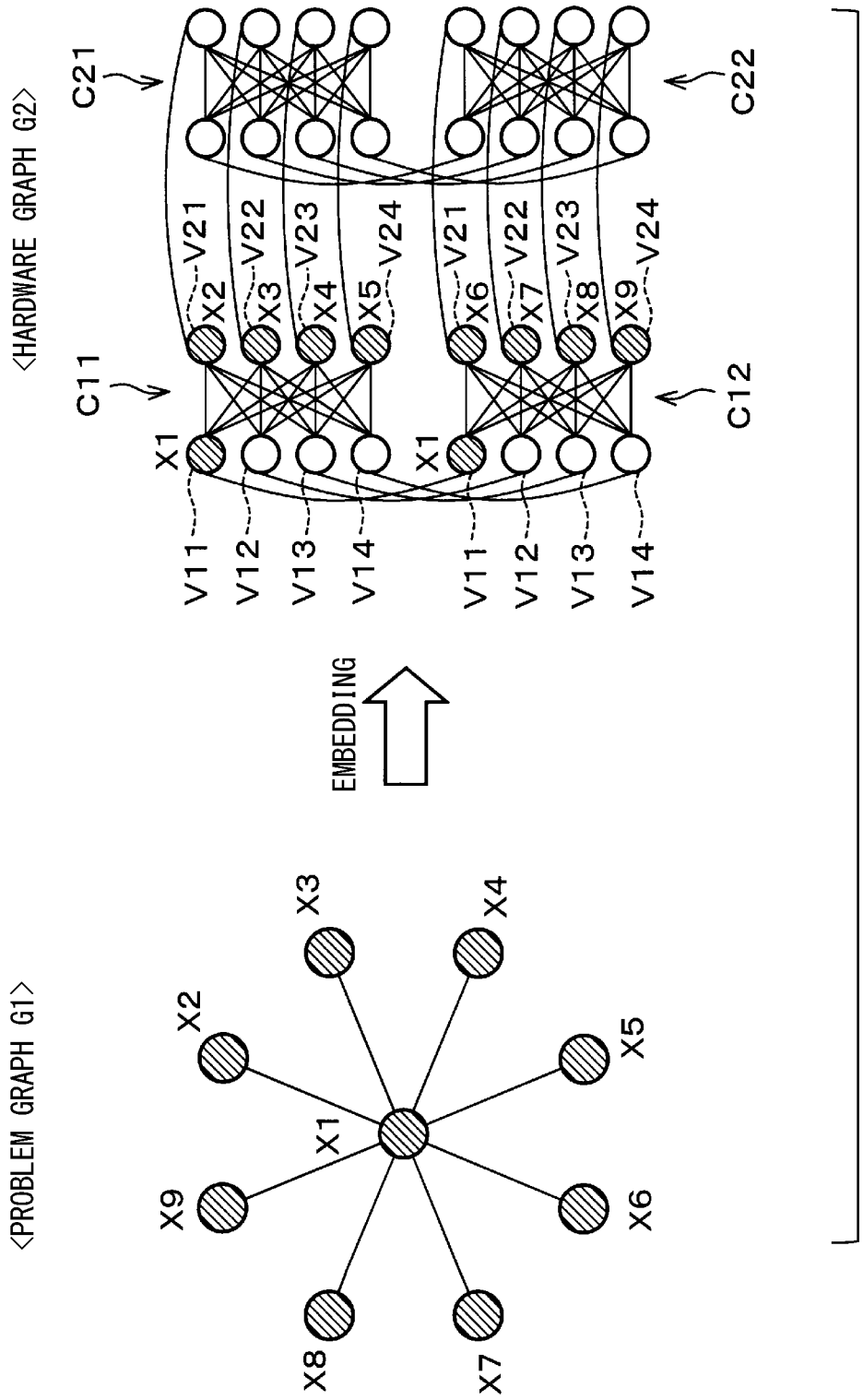

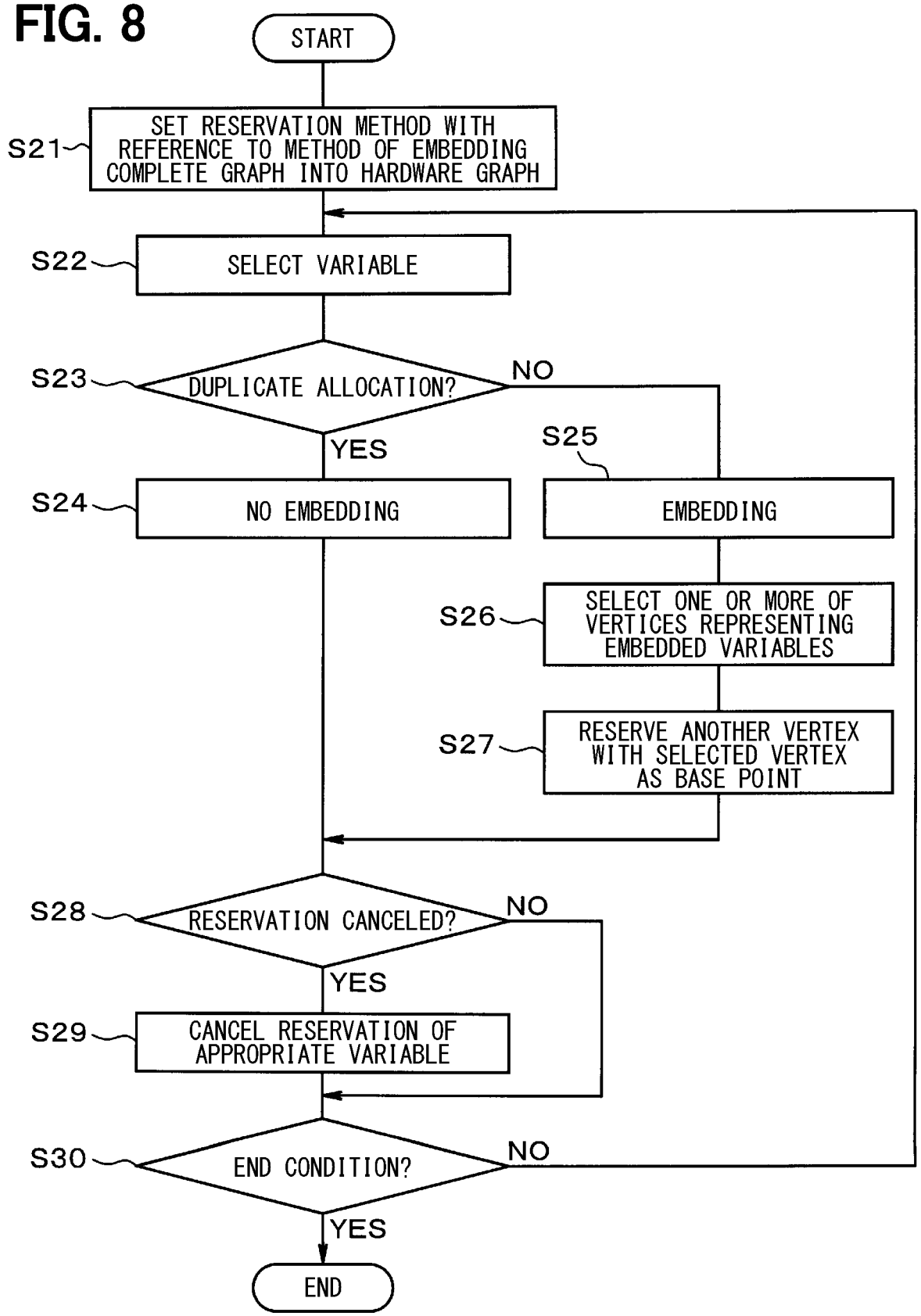

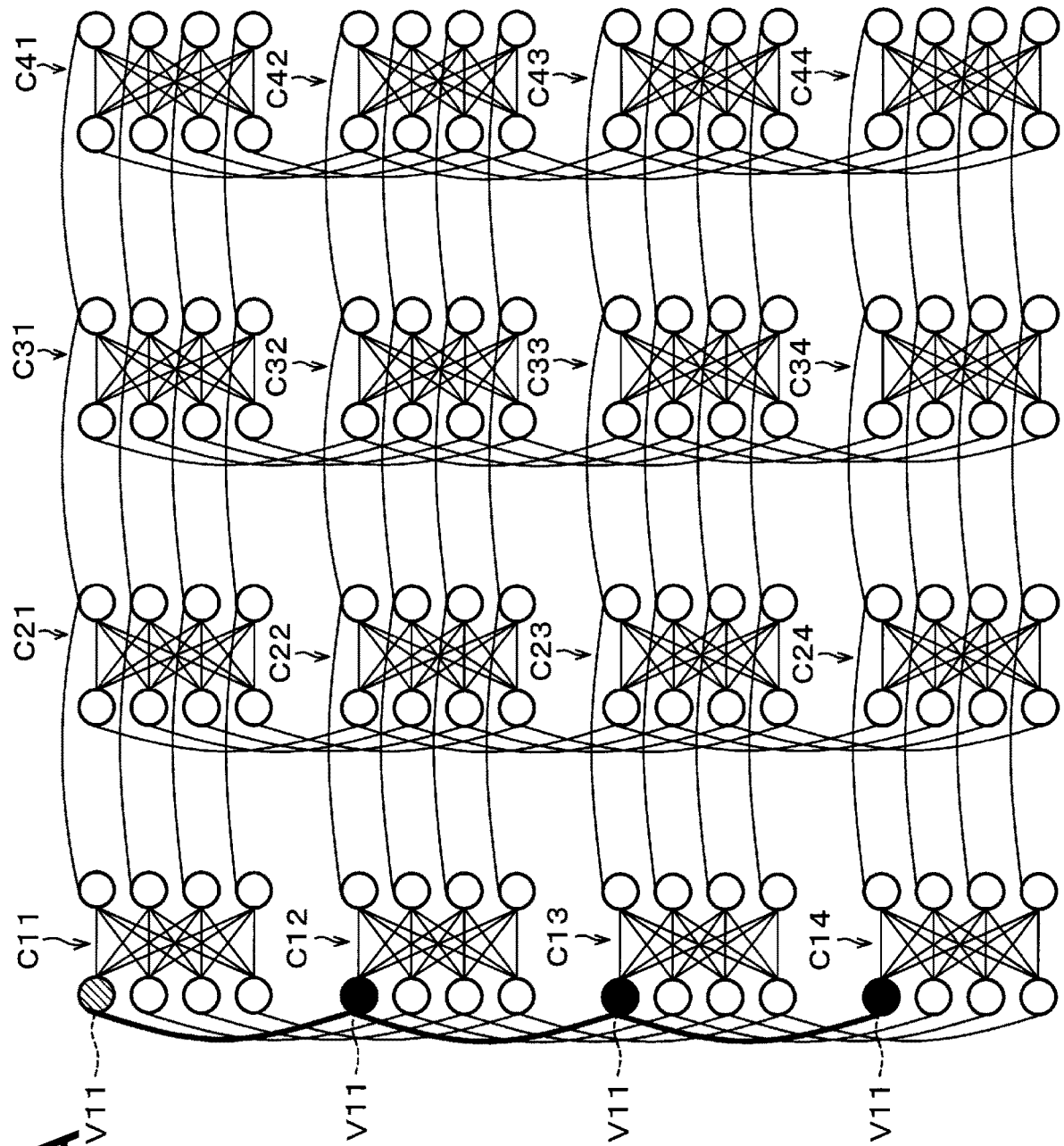

VARIABLE EMBEDDING METHOD AND PROCESSING SYSTEM

CROSS REFERENCE TO RELATED APPLICATION

The present application claims the benefit of priority from Japanese Patent Applications No. 2018-117045 filed on Jun. 20, 2018, and No. 2019-058504 filed on Mar. 26, 2019. The entire disclosures of the above application are incorporated herein by reference.

TECHNICAL FIELD

The present disclosure relates to a method for embedding a variable in a hardware graph and a processing system.

BACKGROUND

Heretofore, the present inventors have developed a technique for solving at high speed an optimization problem for searching for a global optimum value of an evaluation function configured by combining multiple variables together. In order to solve such a combinatorial optimization problem at high speed, dedicated hardware has been generally developed.

SUMMARY

According to an example embodiment, a variable embedding method, for solving a large-scale problem using dedicated hardware by dividing variables of a problem graph into partial problems and by repeating an optimization process of the partial problems when an interaction of the variables of an optimization problem is expressed in the problem graph, includes: determining whether a duplicate allocation of the variables of the optimization problem to the vertices of the hardware graph is required when embedding at least a part of all the variables into the vertices of the hardware graph; and selecting one of the variables requiring no duplicate allocation and embedding selected variable in one of the vertices of the hardware graph without using another one of the variables requiring the duplicate allocation as one of the variables of the partial problem.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram showing a division image from an optimization problem to a partial problem;

FIG. 7B is an illustrative diagram of the process of embedding the variable into the hardware graph (Part 3);

FIG. 8 is a flowchart showing a process of reserving a vertex of the hardware graph;

FIG. 9A is an illustrative diagram of a process of reserving a vertex in a chimera graph (Part 1);

DETAILED DESCRIPTION

Figure 1A:
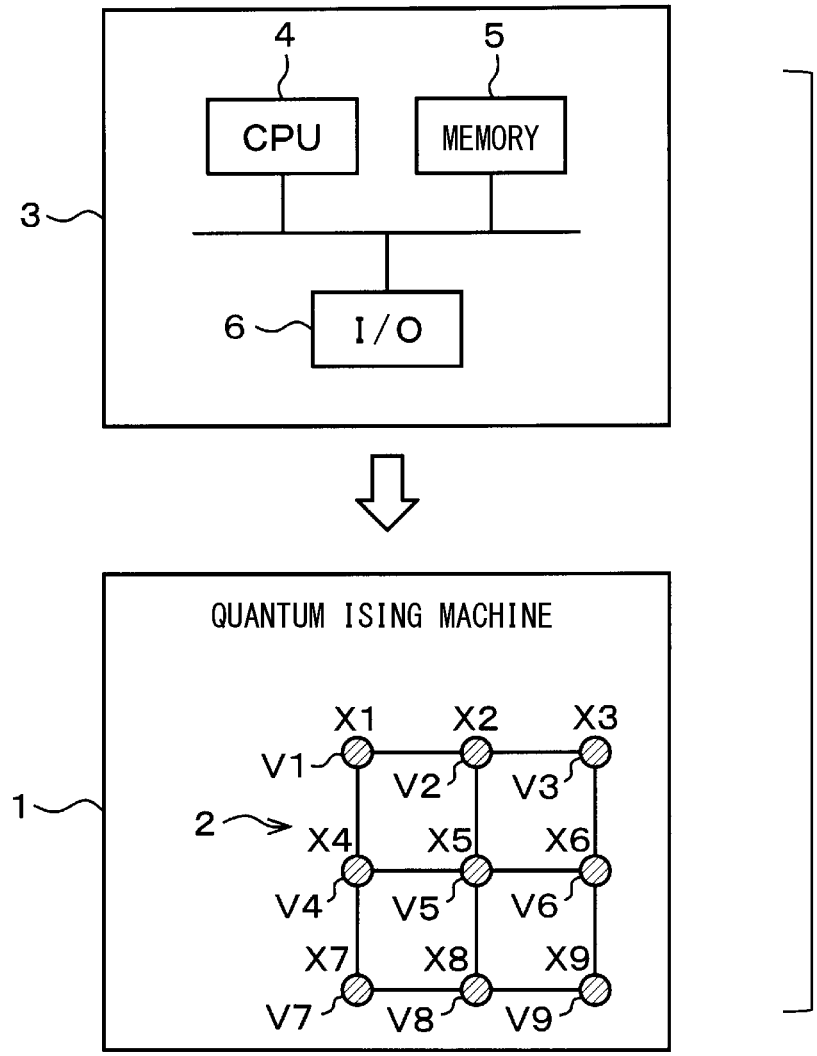
FIG. 1A is an electric configuration diagram according to a first embodiment.
Figure 1B:
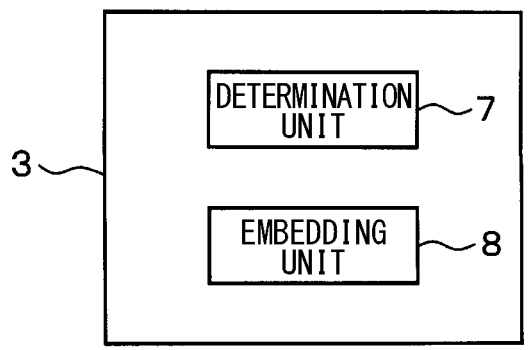
FIG. 1B is a functional configuration diagram.

A conceivable hardware has a specific fixed architecture and can solve the combinatorial optimization problem at higher speed than that of conventional general purpose computers. Since the hardware of the above type has the specific fixed architecture, there are several constraints to solve the combinatorial optimization problem. A first constraint resides in that there is a limit to the absolute number of variables that can be processed at one time. A second constraint resides in that there is a limit on the number of interactions between the variables. In order to efficiently process the optimization problem using the dedicated hardware, it is required to execute the processing under such constraint conditions.

In order to cope with the first constraint, a conceivable technique attempts to obtain a high-precision solution of an original optimization problem by dividing a variable of the optimization problem into partial problems that can be embedded in a hardware graph and repeating an optimization process of the partial problems. However, there is no disclosure as to a specific method for embedding as many variables as possible in the hardware graph. A specific method for embedding a variable of a given optimization problem into the hardware graph is provided as follows.

In the above conceivable technique, a variable is embedded for each vertex of the hardware graph with reference to a problem graph to be solved and the hardware graph. The variable embedding process is divided into a first half and a second half. In the first half, all variables in a given problem are embedded while allowing multiple variables to be allocated to the vertices of the hardware graph in an overlapping manner. In the second half, only one variable is allocated to each vertex on the hardware graph.

The present inventors have confirmed that when the conceivable technique described above is employed, a large amount of processing time is required particularly in the second half of the processing. This is because in this conceivable technique, the variables are embedded in the first half while permitting duplication, and therefore there is a need to correct the duplication in the second half. Therefore, it takes a long time to complete all those processes. In particular, when there is a need to repeatedly embed a large-scale problem into a hardware graph while dividing the problem into partial problems as in the above conceivable technique, it is important to shorten the processing time per time in order to shorten the overall processing time.

Thus, a method is provided for embedding a variable in a hardware graph and a processing system which are capable of shortening a processing time.

According to an example embodiment, when at least a part of all variables is embedded in a vertex of the hardware graph, it is determined whether or not the variables of an optimization problem require duplicate allocation to the vertex of the hardware graph, and the variables requiring no duplicate allocation are selected and embedded in the vertex of the hardware graph without using the variable requiring duplicate allocation as the variable of the partial problem. For that reason, the processing can be performed without taking time for the process of resolving the duplicate allocation, and the processing time can be reduced.

For example, in the process of determining whether or not the duplicate allocation is required, it is only necessary to check whether or not a route in which a vertex to which a variable is not allocated on the hardware graph is set as a starting point and a vertex allocated to an embedded variable adjacent to the variable to be additionally embedded is set as an ending point can be configured on the hardware graph using only an unused vertex.

For example, if the path mentioned above exists, a variable to be additionally embedded or a coupled embedded variable is appropriately embedded for each vertex on the path, so that the variable can be embedded in the hardware graph while reproducing an interaction between the variables in the problem graph. When the path is as short as possible, the number of vertices on the hardware graph to be used can be reduced, as a result of which a method of obtaining the shortest path with the use of a Dijkstra's method or the like is conceivable.

Hereinafter, some embodiments of a variable embedding method and a processing system according to the present invention will be described with reference to the drawings. In the following embodiments, portions having the same function or similar function are denoted by the same reference numerals among the embodiments, and descriptions of configurations having the same or similar function, their functions, cooperative operations, and the like will be omitted as necessary.

First Embodiment

FIGS. 1A to 6 show illustrative diagrams of a first embodiment. A quantum ising machine 1 shown in FIG. 1A is configured with the use of a function-specific ising type hardware 2, configures an interaction between multiple variables X as a physical constraint of the hardware, and performs a simulation by simulating the same situation as the optimization problem with the use of a quantum mechanical property of a material.

The ising type hardware 2 is configured by a quantum processor which is dedicated hardware formed by a specific fixed architecture. The ising type hardware 2 can be represented by a hardware graph G2 having a large number of vertices V (V1 to V9) in an array on virtual hardware and having constraints on an interaction between the vertices V (V1 to V9) of the virtual hardware. In the following description, when a part of those multiple vertices V is specified, the vertex V will be given a subscript as necessary. Also, a part or all of multiple vertices V may be collectively referred to as a vertex V.

The constraint of the interaction between those vertices V may be, for example, as shown in the FIG. 1A, an example in which only the vertices V adjacent to each other in vertical and horizontal directions (for example, between the V1 and the V2, between the V2 and the V3, between the V1 and the V4, . . . ) are coupled to each other, and the other vertices V are not coupled to each other.

In addition, a unit cell C having the multiple vertices V coupled to each other so as to constrain the entire coupling or partial interaction may be configured, and a hardware graph G2 having the unit cells C for multiple grids may be applied, in which case, the coupling of the vertices V between adjacent grids may be constrained.

Figure 5:
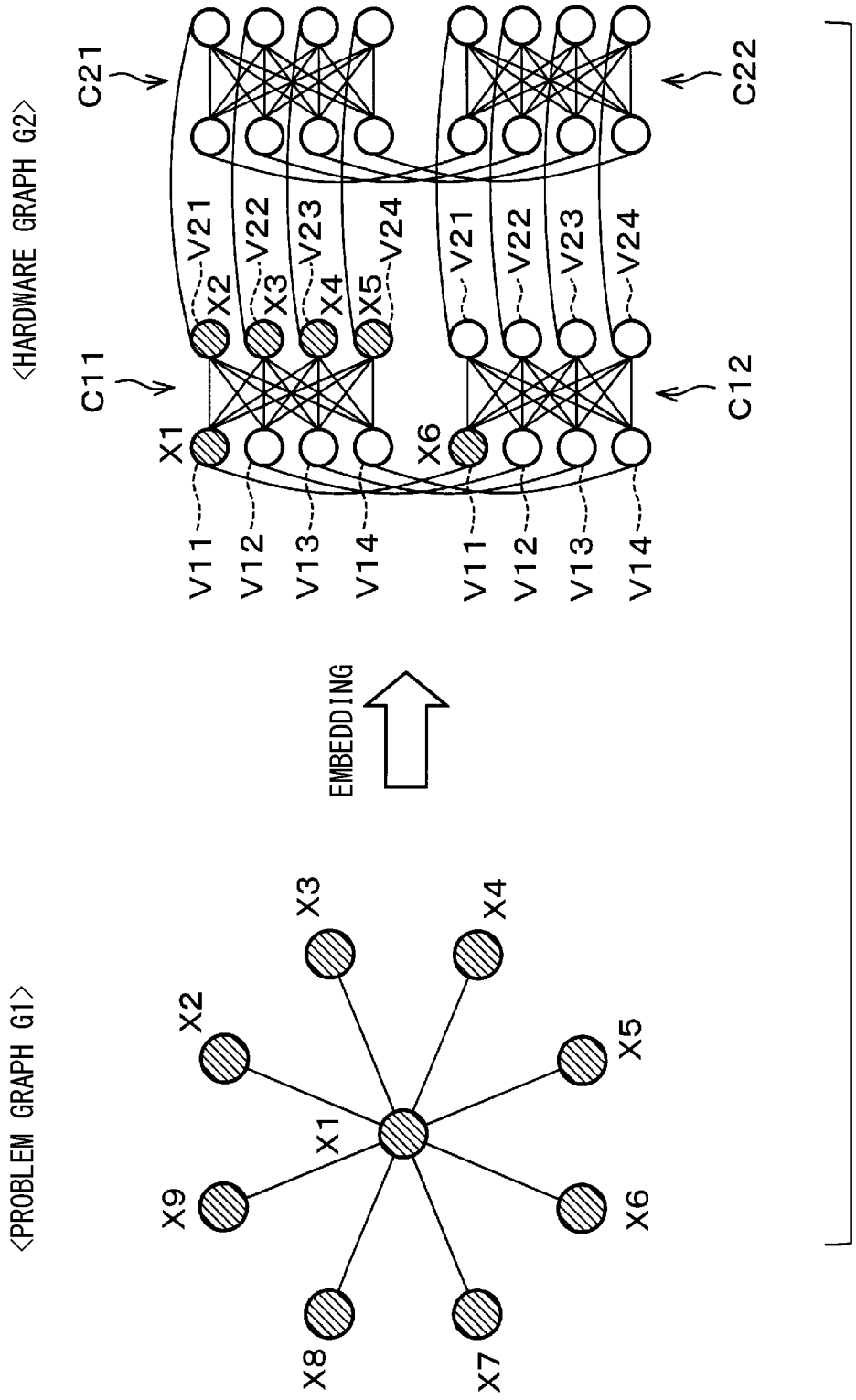
FIG. 5 is an illustrative diagram of a process of embedding a variable into a hardware graph (Part 1)

As a typical example of the hardware graph G2 including the unit cells C for the multiple grids, there is a hardware graph G2 called a chimera graph (refer to a right side of FIG. 5, and FIG. 9, FIG. 10, and the like). The chimera graph is a hardware graph G2 including unit cells C (for example, C11, C12, C21, and C22) having n×m vertices V in the vertical and horizontal directions (corresponding to a first direction and a second direction), for example, and including multiple grids in the vertical and horizontal directions. In the following description, when a part of those unit cells C is specified, the unit cells C will be given subscripts as necessary. In addition, some or all of the unit cells C may be collectively referred to as unit cells C.

As shown on the right side of FIG. 5, the chimera graph is configured by coupling vertices V11 to V14 on a first column of each unit cell C to vertices V21 to V24 on a second column, and coupling the vertices V configuring each unit cell C to the corresponding vertices V of the unit cells C adjacent to each other in succession in the vertical and horizontal directions. The chimera graph is a hardware graph G2 with constraints that other parts than those described above become uncoupled. A coupling relationship of the chimera graph shown on a right side of FIG. 5 will be described in detail. The chimera graph includes multiple grids of unit cells C11 to C22 along the vertical and horizontal directions in which each of the multiple vertices V11 to V14 on a first column are respectively coupled to the multiple vertices V21 to V24 on a second column, the multiple vertices V11 to V14 on the first column are not coupled to each other, and the multiple vertices V21 to V24 on the second column are uncoupled to each other. At that time, the vertices V11 to V14 on the first column of the unit cells C11 and C12 are coupled to each other along the vertical direction, and the vertices V21 to V24 on the second column of the unit cells C11 and C21 are coupled to each other along the horizontal direction.

The computer 3 shown in FIG. 1A configures a variable embedding device, which is a device having a function for embedding a variable X in a form adapted to the ising type hardware 2 of the quantum ising machine 1. The computer 3 is configured by a general purpose computer in which a CPU 4, a memory 5 such as a ROM and a RAM, and an input and output interface 6 are connected to each other by a bus. The memory 5 is used as a non-transitory tangible storage medium. The computer 3 executes a variable embedding program stored in the memory 5 by the CPU 4, searches for a method of embedding an optimal variable X by executing various procedures, and embeds the variable X in the ising type hardware 2 of the quantum ising machine 1.

The optimization process executed by the quantum ising machine 1 indicates a process of assuming a search space configured by a Euclidean space having one or more n dimensions, and obtaining a minimum value of the evaluation function H generated by multiple requests or constraints, or the variable X satisfying the condition that the evaluation function H becomes the minimum value, that is, an optimal solution, in the search space. The evaluation function H represents a function by a mathematical expression generated by multiple requirements and constraints and derived based on one or more n variables X, and may include, for example, an arbitrary polynomial, rational function, irrational function, exponential function, logarithmic function, or a combination of addition, subtraction, division, or the like. Hereinafter, each variable in the n-dimensional problem is referred to as X1, X2, ..., Xn, and some of those variables or each variable is collectively referred to as a variable X, if necessary. As shown in the FIG. 1B, the computer 3 has various functions such as a determination unit 7 and an embedding unit 8 as functions realized by executing programs stored in the memory 5.

Figure 3:
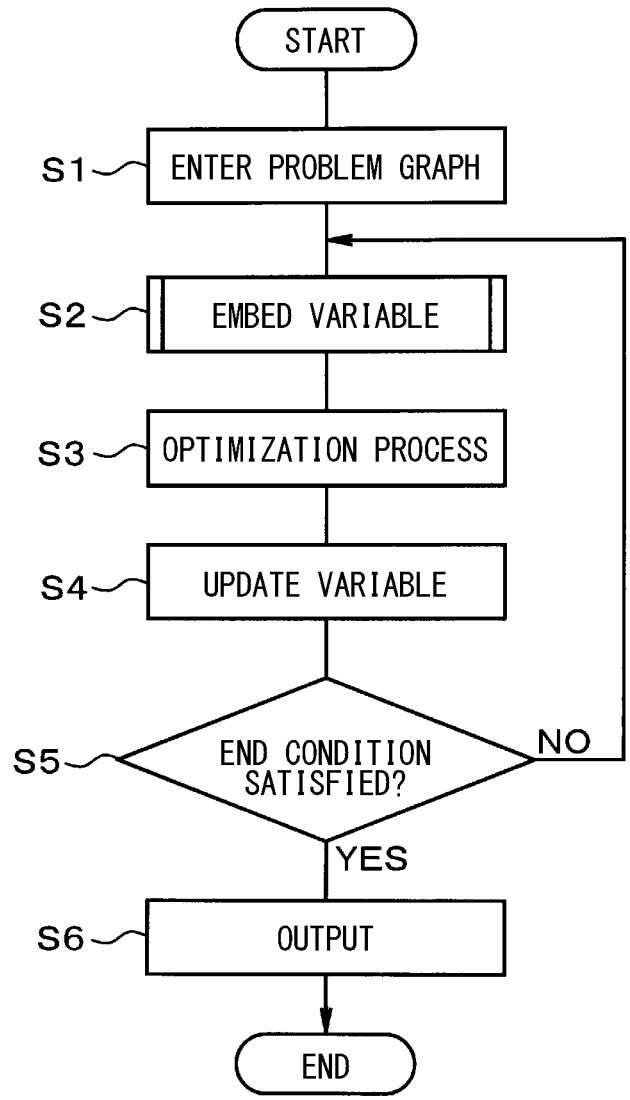
FIG. 3 is a flowchart showing a solution derivation process of the optimization problem.

FIG. 2 shows an image which divides a large-scale problem (original problem) of the optimization problem of the evaluation function H into partial problems, and FIG. 3 shows a series of solution derivation methods of the optimization problem executed by the computer 3 and the quantum ising machine 1 by a flowchart.

As shown in FIG. 3, the computer 3 inputs a problem graph G1 (S1). The problem graph G1 represents a relationship between the interactions of the variables X obtained by the request or the constraint on the evaluation function H as a result of the computer 3 analyzing the evaluation function H. An example of the problem graph G1 is shown on a left side of FIG. 5. The problem graph G1 shows an example in which a variable X1 is coupled to variables X2 to X9, and the other variables X2 to X9 are uncoupled from each other.

Thereafter, the computer 3 embeds the variable X configuring the problem graph G1 in the hardware graph G2 of the ising type hardware 2 (S2). The vertices V corresponding to the same variable X must configure partial graphs coupled with each other on the hardware graph G2. Moreover, the variable X coupled in the problem graph G1 must have at least one coupling on the hardware graph G2. If this rule is not satisfied, the processing cannot be performed appropriately on the quantum ising machine 1. For that reason, the computer 3 is required to appropriately perform the embedding process of the variable X.

Figure 4:
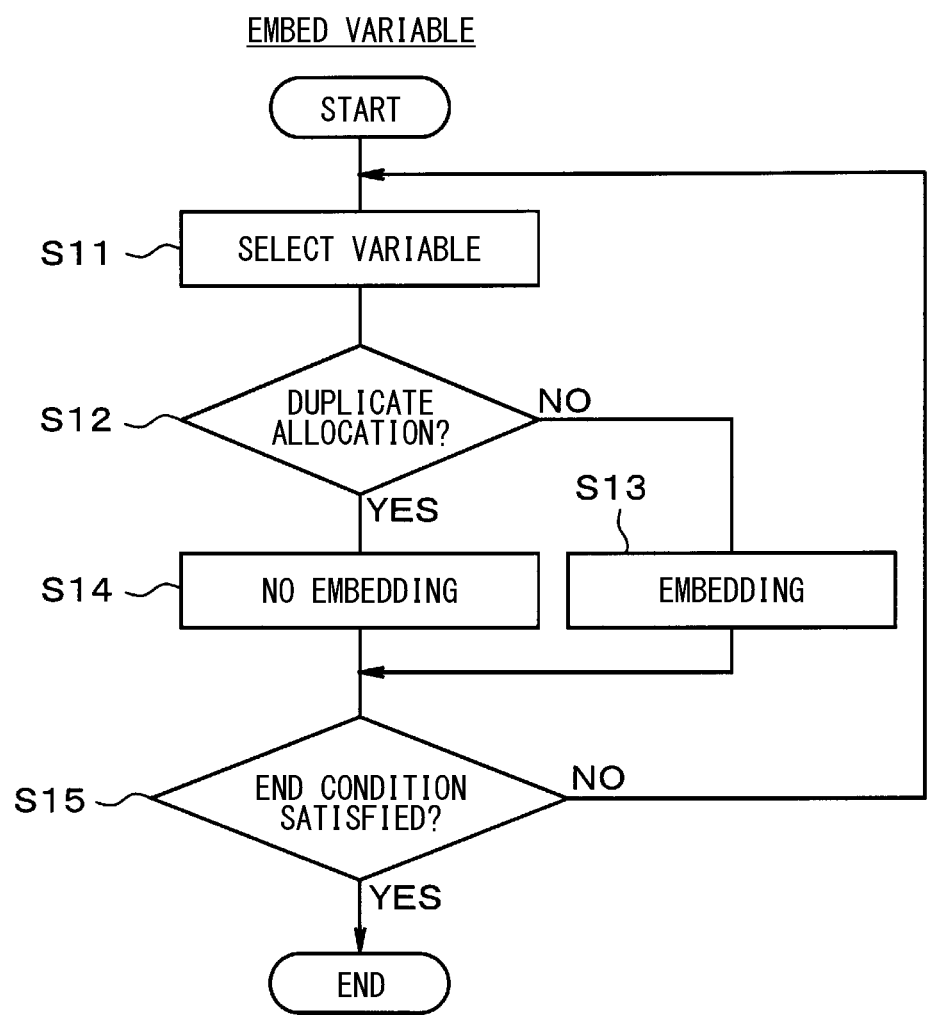
FIG. 4 is a flowchart showing a variable embedding process.

FIG. 4 shows a flowchart of the variable X embedding process. When the computer 3 embeds the variable X in the hardware graph G2 of the quantum ising machine 1, it is determined whether or not the duplicate allocation occurs when the variable X is selected and temporarily embedded in the hardware graph G2 (S12), embeds the variable X in the hardware graph G2 (S13) when the duplicate allocation does not occur, and does not embed the variable X in the hardware graph G2 when the duplicate allocation occurs (S14). Then, the processes of S11 to S14 are repeated until the end condition is satisfied. The ending condition is that the unembedded variable X disappears, or as a result of repeating the processes S11 to S14 up to a predetermined upper limit number of times, it is determined that the variable X cannot be additionally embedded.

For example, FIG. 5 shows an example in which the computer 3 embeds the variable X of the problem graph G1 in the hardware graph G2 of the quantum ising machine 1. The hardware graph G2 uses the chimera graph described above as shown on the right side of FIG. 5.

At that time, the computer 3 randomly selects the variables X1 to X9, and embeds the variables X in the hardware graph G2 in order from the selected variable X. Actually, the variables X1 to X9 are randomly selected and embedded, but in this example, in order to facilitate understanding of the description, an example in which the variables X1 to X9 are embedded in order is shown.

At that time, after embedding the variable X1, the computer 3 embeds the variables X2 to X9. As described above, all of the variables X2 to X9 need to be coupled with the variable X1. For that reason, the variables X2 to X6 selected prior to the variables X7 to X9 are embedded in the vertex V coupled to the variable X1 (refer to the right side of FIG. 5). In this example, since the variables X7 to X9 cannot be coupled with the variable X1 unless the variables X2 to X6 are allocated in duplicate to the embedded vertex V, it is determined in S15 that the end condition is satisfied, and the processing ends without embedding the variables X7 to X9.

Then, when the process of embedding the variables X are completed, the quantum ising machine 1 shifts to the process of FIG. 3 and executes the optimization process (S3). The quantum ising machine 1 substitutes the variables X1 to X6 as partial variables into the evaluation function H in the optimization process, and obtains the values of the variables X1 to X6 so that the evaluation function H satisfies a condition (optimization condition) lower than a predetermined value by using a gradient method or another optimization method (solution derivation process of the partial problem). At that time, the quantum ising machine 1 determines the optimum values of the variables X1 to X6 on condition that a predetermined time has elapsed since the start of the processing or that the processing has been repeated for a predetermined number of trials or more, and updates the variables X1 to X6 (S4). In that case, as the other variables X7 to X9, the quantum ising machine 1 may obtain an evaluation value of the evaluation function H using a fixed value. This makes it possible to solve the partial problems.

Thereafter, returning the processing to S2, the computer 3 randomly selects the variable X again in S2 and embeds the selected variable X in the hardware graph G2, the quantum ising machine 1 executes the optimization process by the variables X, determines the optimum value of the combination of the variables X, and updates the variable X in S4. As the variable X not selected at this time, the optimum value of the variable X obtained as the optimum value before the processing (in this example, the variables X1 to X6) may be used. The variable X that has not been selected once may be set to a fixed value and processed. Then, the quantum ising machine 1 determines that the ending condition is satisfied on the condition that a predetermined time has elapsed from the start of the processing or that the processing has been repeated a predetermined number of times or more (YES in S5), and outputs the result of the variable X, the evaluation value of the evaluation function H, or the like. As a result, the entire optimization problem can be solved. With the repetition of the processing in this manner, the original problem can be divided into partial problems and solved as shown in an image in FIG. 2.

As described above, according to the present embodiment, when a part of all the variables X is embedded in the vertex V of the hardware graph G2, it is determined whether or not the variable X of the optimization problem needs duplicate allocation to the vertex V of the hardware graph G2 (S12), and the variables X7 to X9 requiring duplicate allocation are not used as the variables X7 to X9 of the partial problem, and the variables X1 to X6 requiring no duplicate allocation are selected and embedded in the vertex V of the hardware graph G2. Therefore, in a large-scale optimization problem in which not all the variables X cannot be embedded in the vertices V of the hardware graph G2, when the correlation of the variables X of the optimization problem is represented in the problem graph G1 to solve the large-scale optimization problem, the variables X1 to X9 of the problem graph G1 can be divided into partial problems that can be embedded in the hardware graph G2, and the partial problem optimization process can be repeated to solve the large-scale optimization problem.

FIG. 5 shows an example in which the number of variables X in the problem graph G1 is nine for simplification of the description. For that reason, only a part of the vertex V on the hardware graph G2 can be used. However, it should be noted that in practice, when solving the large-scale problem in which a large number of variables X exist, the computer 3 executes the embedding process described above, so that more vertices V on the hardware graph G2 can be used and variables X of larger partial problems can be embedded.

Comparative Example

Figure 6:
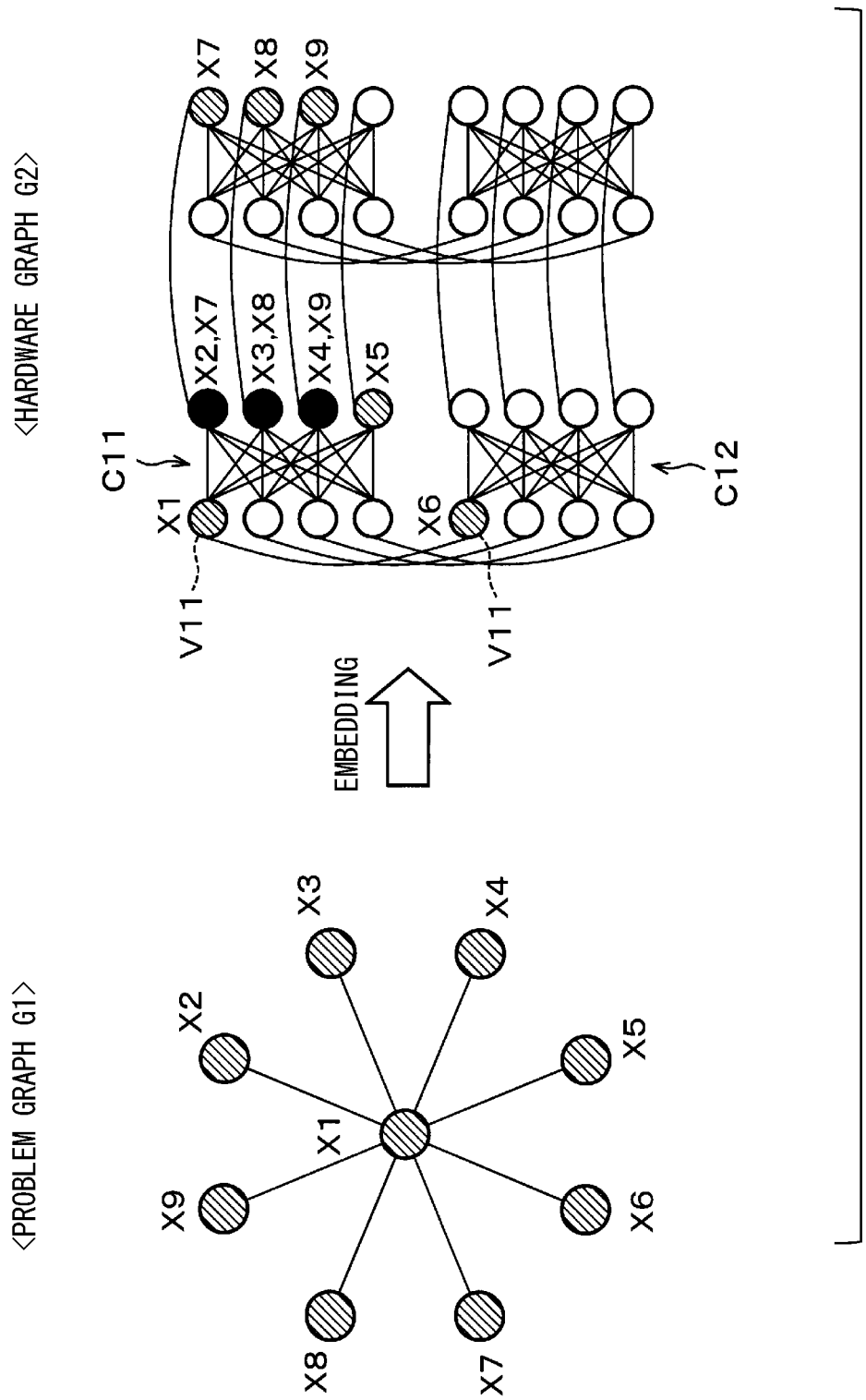
FIG. 6 is an illustrative diagram of the process of embedding the variable into the hardware graph (Part 2)

FIG. 6 shows a comparative example in which the technique disclosed in Patent Literature 2, for example, is applied and duplicate allocation is allowed. In such a case, since there are only five vertices V in which the variable X1 is coupled to the vertex V11 of the embedded unit cell C11, the variables X2 to X6 can be embedded in the hardware graph G2 without duplicate allocation. However, the variables X7 to X9 are embedded in the vertices V21 to V23 by being allocated in an overlapping manner. When such processing is applied, since the optimum value is calculated while resolving the duplicate allocation, a large amount of time is required.

<Overview and Effects of the Present Embodiment>

According to the present embodiment, the computer 3 determines whether or not duplicate allocation is required when performing the embedding process of the variable X (S12), and selects the unnecessary variables X1 to X6 of the duplicate allocation and embeds the selected variables X1 to 6 in the vertex V of the hardware graph G2, without using the variables X7 to X9 that require duplicate allocation as the variables X of the partial problem. This makes it possible to perform the processing without allowing the duplicate allocation as shown in the prior art, and makes it unnecessary to perform the processing for resolving the duplicate allocation at all, thereby being capable of drastically reducing the processing time.

Second Embodiment

FIGS. 7 to 10 show additional illustrative diagrams of a second embodiment. In the present embodiment, a computer 3 functions as a reservation unit, a selection unit, a prohibition unit, an associating unit, and a cancel unit by executing a program stored in a memory 5. According to the method of the first embodiment, if the coupled number of the problem graph G1 is relatively small, the variable X configuring the large partial problem can be embedded on the hardware graph G2 by using only the variable X that does not require the duplicate allocation. However, as shown in FIG. 5, when there are a large number of variables X1 coupled to a large number of variables X2 to X9 in a problem graph G1, a growth of a partial problem stops before the vertex V on a hardware graph G2 is exhausted.

When embedding each variable X on the hardware graph G2, the computer 3 desirably selects at least one of the vertices V included in the partial graph on the hardware graph G2 allocated to each variable X, couples the selected vertex V with the hardware graph G2, prohibits embedding of the variable X other than the corresponding variable X for the vertex V following a direction in which the number of coupling with other variables X can be efficiently increased on the hardware graph G2, and leaves room for extending the coupled partial graph of the corresponding variable X on the hardware graph G2. Hereinafter, the operation is referred to as "reservation".

FIG. 8 shows a flowchart of the process of embedding into the vertex V on the hardware graph G2. As shown in FIG. 8, first, the computer 3 sets a reservation method (associating method) using a method of embedding the variable X of a complete graph G1a in the hardware graph G2 (as a reference) (S21).

A specific reservation method, a so-called associating method, differs depending on the type of the hardware graph G2. It is desirable to use (that is, refer to) a method of embedding the variables X of the complete graph G1a (refer to FIG. 7A) having the largest number of coupling among the variables assumed as the problem graph G1 in the hardware graph G2.

Figure 7A:
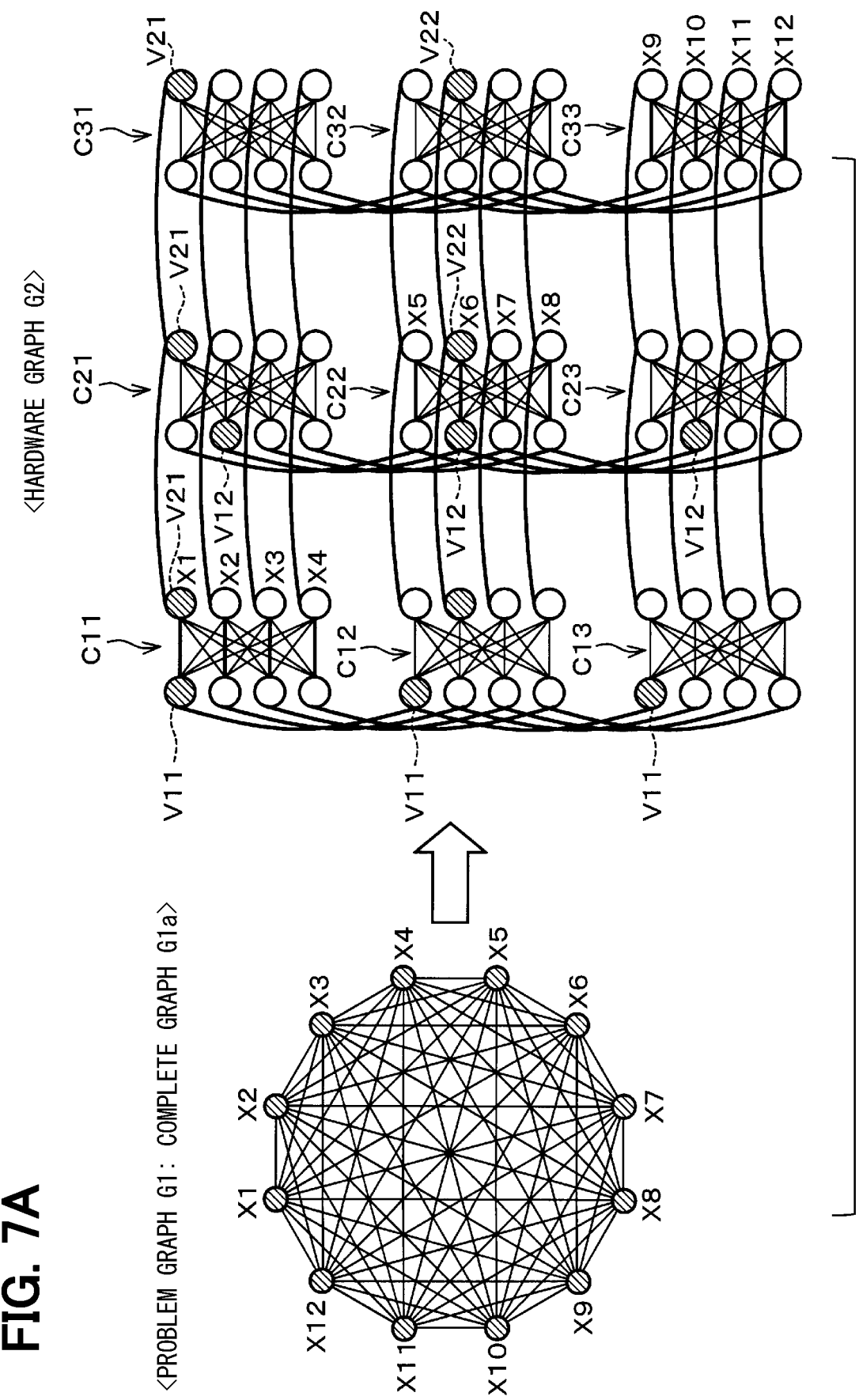
FIG. 7A is an illustrative diagram of a method of embedding a complete graph into a hardware graph according to a second embodiment.

FIG. 7A shows a common method of embedding the complete graph G1a in the hardware graph G2 (chimera graph) in order to make a process of setting the reservation method easier to understand, and graphs coupled to each other by bold lines represent coupled partial graphs allocated to respective variables. Variables X1 to X4 of the complete graph G1a are embedded in a partial graph that includes vertices V21 to V24 of a unit cell C11. Variables X5 to X8 are embedded in a partial graph that includes the vertex V21 to V24 of a unit cell C22. Variables X9 to X12 are embedded in a partial graph that includes the vertices V21 to V24 of a unit cell C33.

As shown in the FIG. 7A, the partial graphs coupled to each other on the hardware graph G2 (graphs coupled to each other by bold lines in FIG. 7A) have structures in which the unit cells C are coupled to each other in the vertical direction and the horizontal direction. The computer 3 associates the variables X1 to X12 with each vertex V tracked in a direction crossing the unit cell C in S21 with the use of (with reference to) the method of embedding the variables X1 to X12. In other words, the computer 3 associates the vertex V included in the unit cell C in the vertical direction and/or the horizontal direction corresponding to a certain vertex V in S21.

A vertex V21 of the unit cell C11 (embedded vertex V of a variable X1) indicated in a right drawing of FIG. 7A is denoted with vertices V11 and V21 of the unit cells C to be associated with the hardware graph G2, and a vertex V22 (embedded vertex V of a variable X6) indicated in the right drawing of FIG. 7A is denoted with vertices V12 and V22 of the unit cells C to be associated with the hardware graph G2.

The computer 3 associates the vertices V11 of the unit cells C11, C12, C13, and so on, and also associates the vertices V21 of the unit cells C21, C31, and so on with the vertex V21 of the unit cell C11 on the hardware graph G2. Further, the computer 3 associates the vertex V22 of the unit cell C22 with the vertices V12 of the unit cell C22, C23, and so on, and also associates the vertices V22 of the unit cell C31, C41, and so on, with the vertex V22 of the unit cell C22 on the hardware graph G2.

Figure 9B:
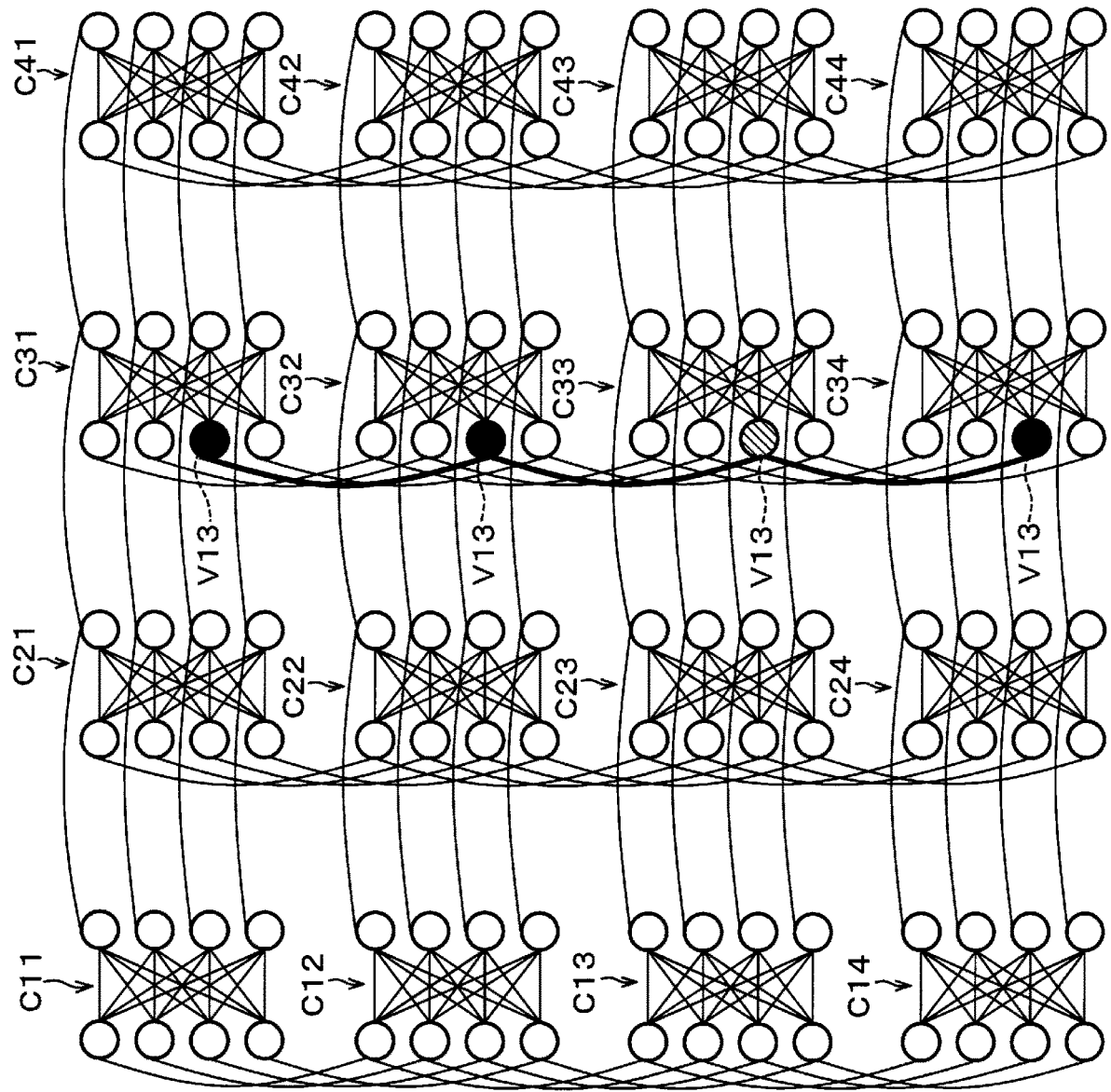
FIG. 9B is an illustrative diagram of the process of reserving the vertex in the chimera graph (Part 2)
Figure 10A:
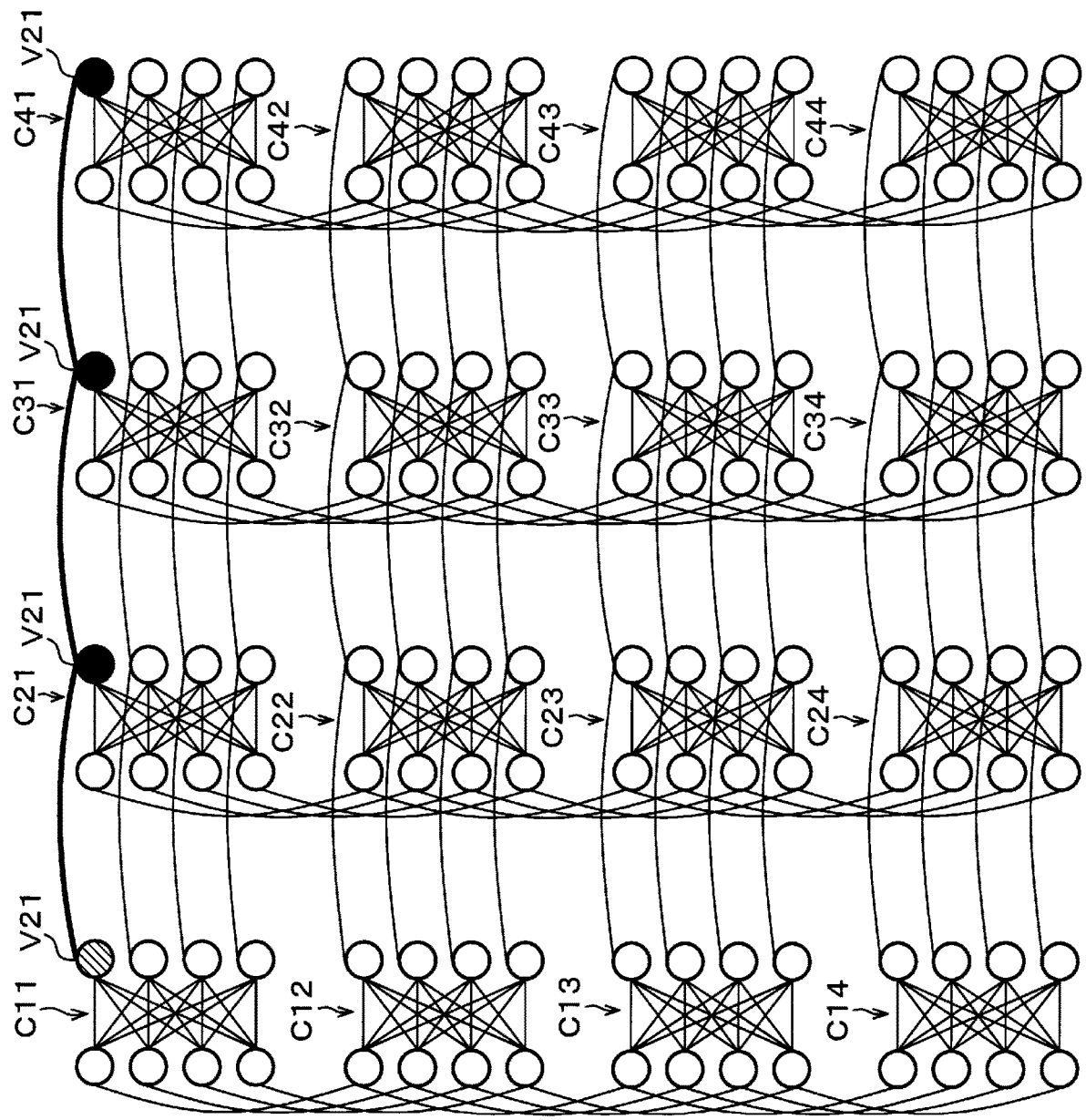
FIG. 10A is an illustrative diagram of the process of reserving the vertex in the chimera graph (Part 3)
Figure 10B:
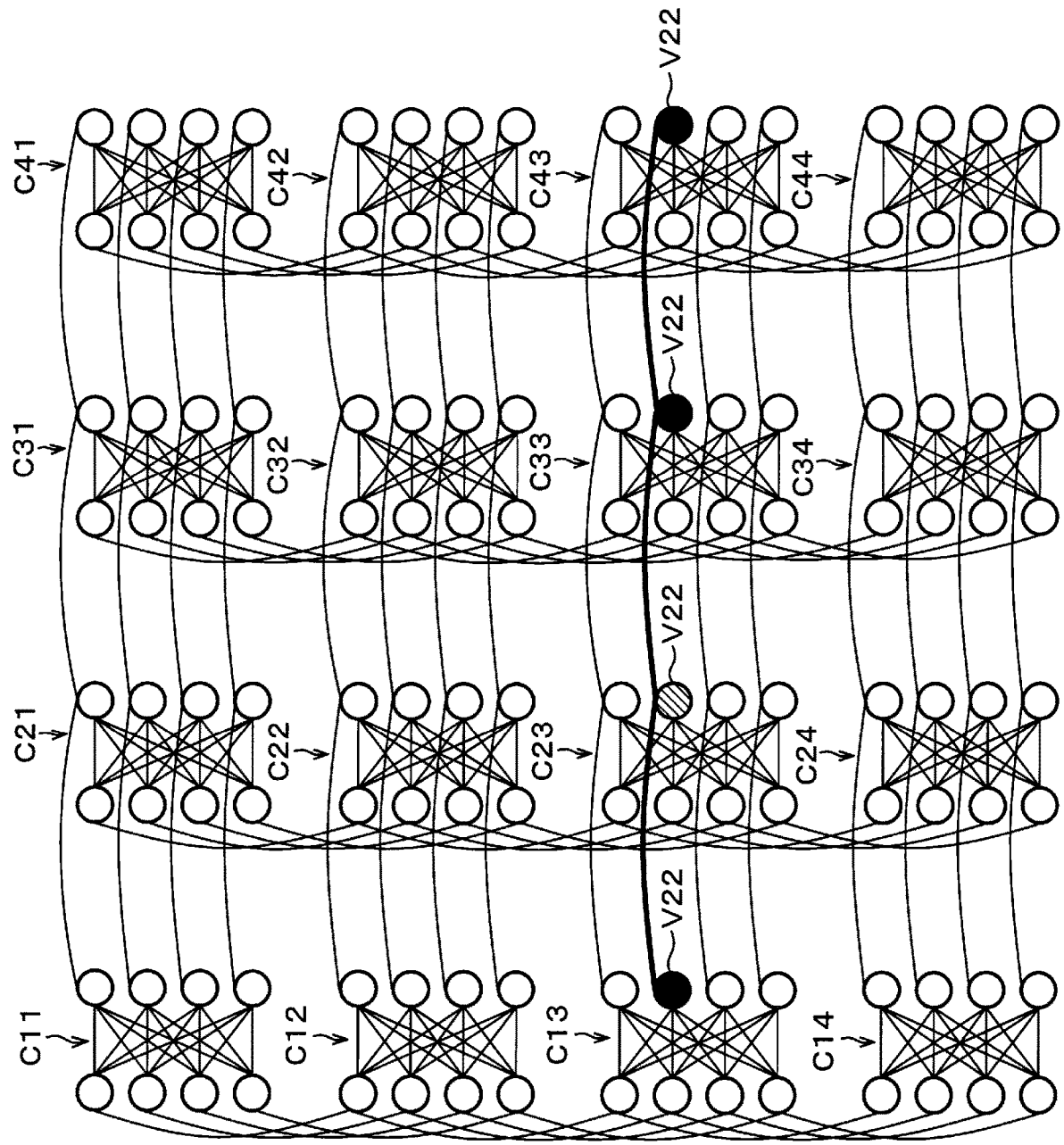
FIG. 10B is an illustrative diagram of the process of reserving the vertex in the chimera graph (Part 4)

Further, the computer 3 may use (refer to) such a method of embedding the variable X of the complete graph G1a in the hardware graph G2, and may associate the vertices V using a part of the embedding method. The above examples are shown in FIG. 9A, FIG. 9B, FIG. 10A, and FIG. 10B. FIG. 9A to FIG. 10B illustrate examples showing a chimera graph with 2×4 vertices V coupled unit cell C as multiple grid minutes of 4×4 as the hardware graph G2, in which the vertices V on the hardware graph G2 are associated with each other. FIG. 9A and FIG. 9B show examples of associating with the vertices V tracing in a direction extending in the vertical direction, and FIGS. 10A and 10B show examples of associating with the vertices V tracing in a direction extending in the horizontal direction.

As shown in the FIG. 9A, the computer 3 may associate the vertex V11 (corresponding to a first vertex) of a unit cell C11 selected as a base point with the vertices V11 (corresponding to second vertices) of the unit cells C12, C13, C14, and so on coupled continuously in the adjacent direction (in this case, the vertical direction), or as shown in the FIG. 9B, the computer 3 may associate a vertex V13 (corresponding to the first vertex) of a unit cell C33 selected as the base point with vertices V13 (corresponding to the second vertex) of unit cells C31, C32, and C34 coupled continuously in the adjacent direction (in this case, the vertical direction).

As shown in the FIG. 10A, the computer 3 may associate the vertex V21 (corresponding to a first vertex) of the unit cell C11 selected as a base point with the vertices V21 (corresponding to second vertices) of the unit cells C21, C31, and C41 coupled continuously in the adjacent horizontal direction, or as shown in the FIG. 10B, the computer 3 may associate a vertex V22 (corresponding to the second vertex) of a unit cell C23 selected as the base point with the vertices V22 (corresponding to the second vertices) of unit cells C13, C33, and C43 coupled continuously in the adjacent horizontal direction.

Then, the computer 3 selects a variable X (S22 in FIG. 8), determines whether or not a duplicate allocation is required (S23), and if the duplicate allocation is required, the computer 3 embeds no variable X (S24), but even if the computer 3 embeds the variable X (S25) when the duplicate allocation is not required, the computer 3 subsequently selects one or more of the vertices V embedded with the variable X (S26), and reserves another vertex V with the selected vertex V as a base point (S27). Then, the computer 3 determines whether or not the embedding prohibition to the reserved vertex V is released (canceled) (S28), releases (cancels) the reservation if the reservation is canceled (S29), determines whether or not the end condition is satisfied (S30), returns the process to S22 if the condition is not satisfied, and selects the variable X again to execute the processing of S23 to S30.

For example, in the case where the problem graph G1 has the configuration on the left side of the FIG. 7B, if the computer 3 embeds the variable X1 in the vertex V11 of the unit cell C11 on the hardware graph G2, for example, when the vertices V11 of the unit cells C12, C13, and C14 is associated with each other as shown in FIG. 9A in S21, for example, the computer 3 can reserve each vertex V11 (corresponding to the second vertex) of the unit cells C12, C13, and so on continuously coupled in the vertical direction to the vertex V11 of the unit cell C11 as embedding of the variable X1 (S26 to S27).

For that reason, for example, as shown on the right side of the FIG. 7B, when the vertex V11 of the unit cell C11 is embedded by the variable X1 on the hardware graph G2, the vertex V11 of the unit cell C12 is reserved and reserved for the variable X1. At that time, only the variable X1 is allowed to be embedded in the vertex V11 of the unit cell C12 until all the variables X2 to X9 are embedded.

Subsequently, when the computer 3 selects the variables X2 to X9 in this order after the embedding process of the variable X1 and embeds the variable X2 to X9 in the vertex V of the hardware graph G2, the computer 3 embeds the variable X2 to X5 in this order in the vertex V21 to V24 coupled to the vertex V11 of the unit cell C11, as shown on a right side of the FIG. 7B.

Next, when the computer 3 embeds the variable X6 in the hardware graph G2, the vertex V11 of the unit cell C12 is reserved for the variable X1, and the embedding of the variable X6 in the vertex V11 of the unit cell C12 is prohibited. For that reason, the computer 3 embeds the variable X1 in the vertex V11 of the unit cell C12, and embeds the variable X6 in the vertex V21 of the unit cell C12. As a result, the variable X1 is embedded in the vertex V11 of the unit cell C12, whereby the variable X that can be coupled with the variable X1 can be increased, and the variables X7 to X9 can be embedded in the vertices V22 to V24 of the unit cell C12, respectively.

As described above, the variable X is embedded while leaving room to extend the partial graph on the hardware graph G2, thereby being capable of embedding the variables X1 to X9 without performing the duplicate allocation. In this example, only the reservation of the variable X1 is focused on, but when the variables X2 to X9 are additionally embedded, the reservation of the vertex V is executed for all the variables X in S25 to S27. The computer 3 may cancel the reservation of the variable X when the reservation is to be canceled (S28 to S29). This makes it possible to efficiently grow the partial problem even in the problem graph G1 having a large number of coupling.

Thereafter, although not shown in FIG. 8, the quantum ising machine 1 executes the optimization process in the same manner as S3 in FIG. 3, thereby being capable of quickly and accurately obtaining the optimum values of all the variables X1 to X9. In the present embodiment, the nine variables X1 to X9 are used to simplify the description. For that reason, although a simple example in which all the variables X1 to X9 can be embedded in the hardware graph G2 in the embedding process of one routine has been shown, in reality, a large-scale problem (original problem) of the optimization problem is solved with the use of a larger number of variables X.

At that time, as has been described in the first embodiment, a partial problem is solved by embedding a part of the variable X in one embedding process of the large number of variables X. Even in such a case, with the application of the embedding method described in the present embodiment, more variables X can be embedded in the vertex V than in the first embodiment described above. For that reason, the hardware resources can be effectively utilized, and a calculation time of the optimum value can be shortened.

<Overview and Effects of the Present Embodiment>

As described above, according to the present embodiment, the vertices V of the hardware graph G2 are associated (the reservation method is set) based on the embedding method when embedding the complete graph G1a in the hardware graph G2 (S21), at least one vertex V coupled by the partial graph is selected from the vertices V on the hardware graph G2 (S26), and the vertex V11 of the unit cell C12, which is coupled from the vertex V11 of the selected unit cell C11 and which increases the coupling with the other variables X2 to X9, is reserved in correspondence with the variable X1 to be embedded in S25 based on the content of the associating (the reservation method) when embedding each variable X in the hardware graph G2 (S27), thereby prohibiting the embedding of the other variables X2 to X9 other than the variable X1 to be embedded.

This creates room for extending the coupling of the variable X on the hardware graph G2. In addition, since the vertex V to be associated is determined in advance based on the embedding method of the complete graph G1a having the highest coupling level in the problem graph G1, the partial problem can be expanded and grown even if the original problem of the optimization problem is a problem having a high coupling concentration. For that reason, when solving the whole large-scale problem (original problem) by repeatedly solving the partial problem, a larger number of variables X can be embedded in the vertex V when solving one partial problem even in comparison with the method of the first embodiment, and a time for solving the original problem can be reduced. Although an example in which a chimera graph is applied as the hardware graph G2 is shown, the hardware graph G2 having another structure may be used, and the vertex V to be associated may be determined based on the method of embedding the complete graph G1a in each hardware graph G2.

Third Embodiment

Figure 11:
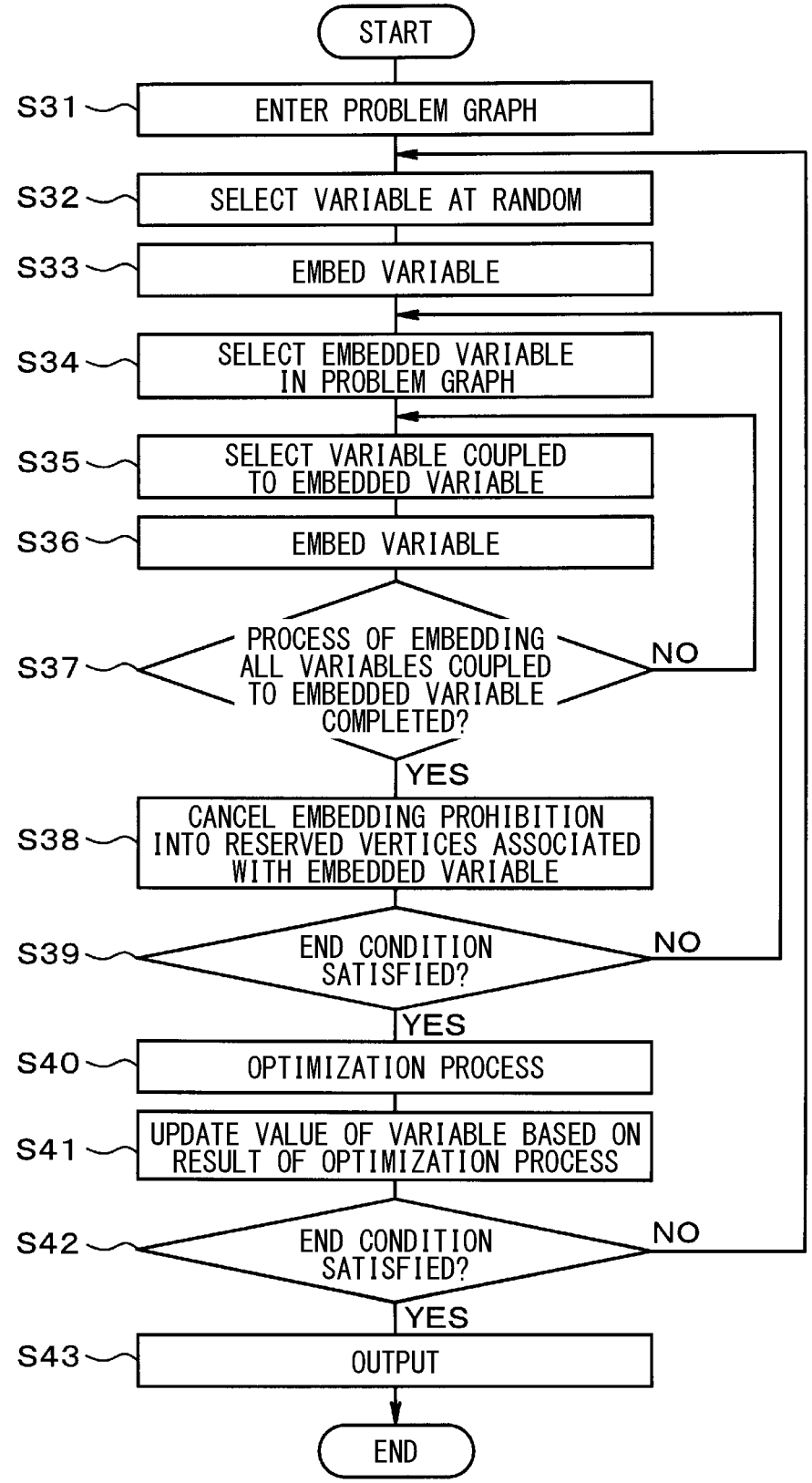
FIG. 11 is a flowchart showing a solution derivation process of an optimization problem according to a third embodiment.
Figure 12:
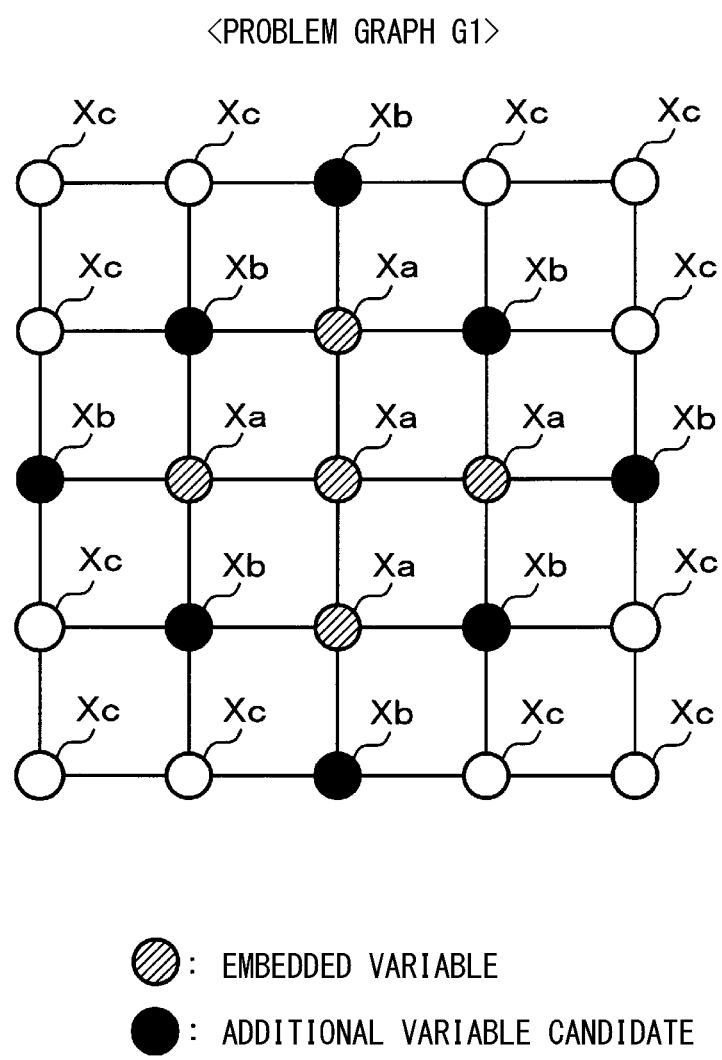
FIG. 12 is a diagram illustrating the content of a problem graph.
Figure 13:
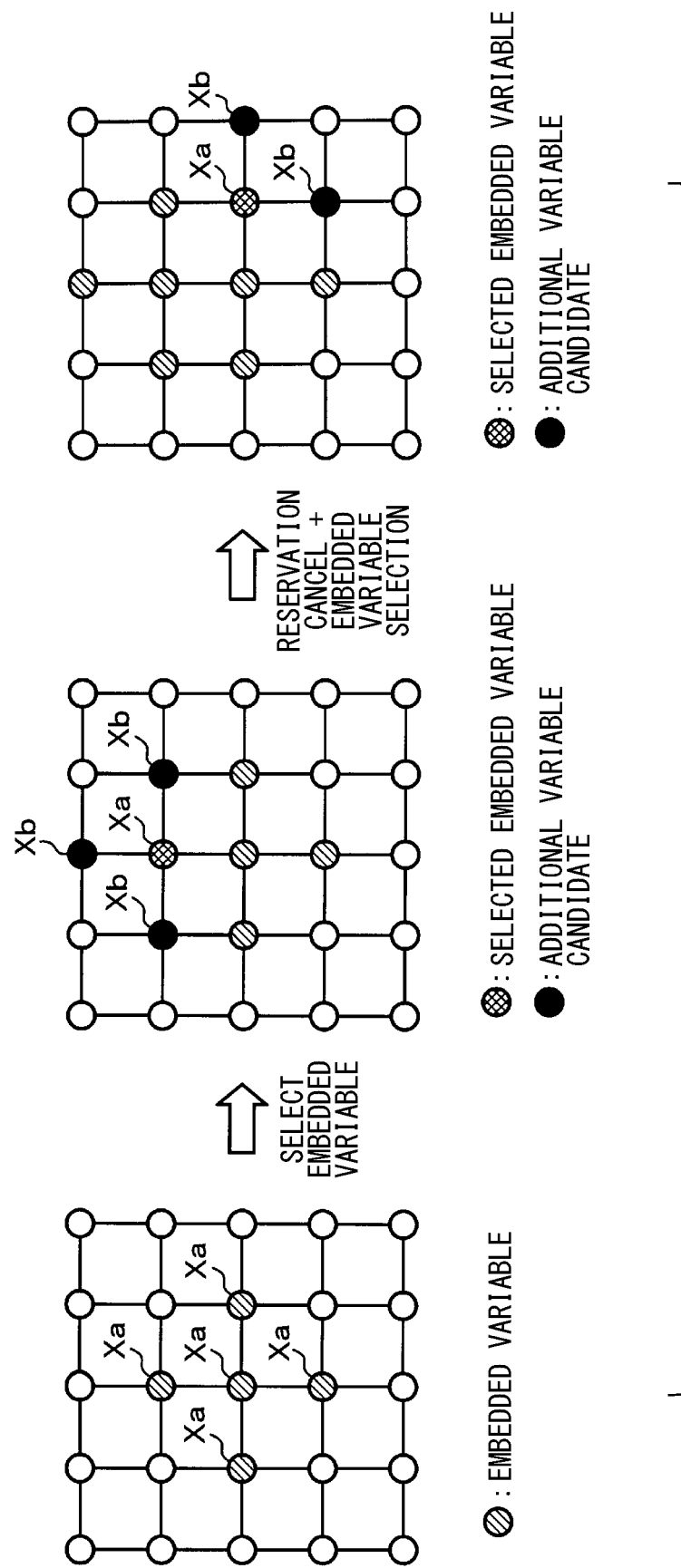
FIG. 13 is an illustrative diagram of an embedding order in the problem graph.

FIGS. 11 to 13 show additional illustrative diagrams of a third embodiment. In the present embodiment, as a result of a computer 3 deriving a correlation of variables X of an evaluation function H, it is assumed that the variables X in the problem graph G1 are coupled to each other in a lattice shape as shown in FIG. 12.

The computer 3 and a quantum ising machine 1 will be described on the assumption that the embedding process of the variable X according to the first embodiment and the associating process and the reservation process on a hardware graph G2 described according to the second embodiment are executed. In the present embodiment, the computer 3 functions as a prohibition unit, a cancel unit, and a selection unit by executing a program stored in a memory 5.

In an initial state, the computer 3 inputs a problem graph G1 (S31), randomly selects the variable X of the problem graph G1 (S32), and embeds the selected variable X in the hardware graph G2 (S33). At that time, on the hardware graph G2, as described in the second embodiment, the vertex V of another unit cell C corresponding to the vertex V is reserved and secured. For example, when the hardware graph G2 is configured by the chimera graph shown in FIG. 9 or FIG. 10, when a variable Xa is embedded in a vertex V11 of the unit cell C11, the vertices V11 of unit cells C12, C13, and so on which are coupled from the vertex V11 of the selected unit cell C11 and which increases the coupling to other variables X (for example, Xb, Xc) are reserved in correspondence with the variable Xa to be embedded. As a result, the vertices V11 of the unit cells C12, C13, and so on are reserved and reserved corresponding to the variables Xa, and the embedding of other variables X (for example, Xb, Xc) is prohibited.

Thereafter, the computer 3 selects the embedded variable Xa in the problem graph G1 (S34), selects the unembedded variable Xb coupled to the embedded variable Xa (S35), and embeds the variable Xb in the hardware graph G2 (S36). FIG. 12 shows candidates for the embedded variable Xa and the variable Xb to be added during processing. As shown in FIG. 12, when selecting a variable X on the problem graph G1, the computer 3 selects a variable Xb to be coupled to the embedded variable Xa in S35, and embeds the variable Xb in the hardware graph G2 in S36. At that time, as shown in S12 to S14 of FIG. 4, the computer 3 does not embed the variable of the duplicate allocation in the hardware graph G2, but embeds the variable in the hardware graph G2 unless the variable is not the duplicate allocation.

In addition, the computer 3 determines whether or not the embedding process of all the variables Xb coupled to the embedded variable Xa has been completed (S37), and if not completed (NO in S37), the computer 3 selects the variable Xb in S35 until there is no more variable Xb coupled to the embedded variable Xa, and embeds the variable Xb in S36. When the variable Xb disappears (YES in S37), the computer 3 releases the prohibition of embedding into the reserved vertex V in association with the embedded variable Xa (S38). In other words, since the embedding of the other variable X other than the embedded variable Xa is prohibited for the specific vertex V of the hardware graph G2 in S33, the embedding of the other variable X in the vertex V reserved for the embedded variable Xa selected in S34 is prohibited until immediately before the computer 3 executes the processing of S38, but after the processing of S38 is executed, the other variable X can be embedded.

Therefore, the unembedded variable Xb or Xc at that point can be embedded in the hardware graph G2 using the vertex V whose reservation has been released (canceled) in S38, and the hardware graph G2 can be efficiently used. Then, the computer 3 repeatedly executes the processes of S34 to S38 until the end condition is satisfied. The end condition at that time is that the embedded variable Xa disappears, the unembedded variables Xb, Xc disappear, the trials are repeated a predetermined number of times or more, and the like.

A specific example of the processing contents of S35 to S39 is shown in FIG. 13. As shown in the center of FIG. 13, the computer 3 selects one embedded variable Xa and selects a variable Xb coupled to the embedded variable Xa, and after embedding all of the coupled variables Xb, the computer 3 cancels the reservation of the vertex V of the hardware graph G2 corresponding to the selected embedded variable Xa. Then, as shown on a right side of FIG. 13, the computer 3 selects another embedded variable Xa, and further selects an unembedded variable Xb coupled to the other embedded variable Xa. This makes it possible to embed the unembedded variables Xb and Xc while canceling the reservation set in the hardware graph G2, and makes it possible to increase the number of embedded variables X in the partial problem solution derivation processing as compared with the second embodiment.

Thereafter, after the quantum ising machine 1 executes the optimization process relating to the partial problem (S40), the computer 3 updates the variable X based on the processing result of the quantum ising machine 1 (S41), and determines whether or not the end condition is satisfied (S42). If the end condition is not satisfied, the process returns to S32, and the computer 3 repeatedly executes the process again from the point where the variable X of the problem graph G1 is newly selected. The computer 3 outputs the solution of the variable X when the end condition of Step S42 is satisfied (S43). As the end condition of S42, the same condition as the end condition in S5 according to the first embodiment may be used, and therefore a description of the end condition in S42 will be omitted.

<Overview and Effects of the Present Embodiment>

According to the present embodiment, the computer 3 selects one embedded variable Xa, and cancels the reservation after completing the embedding process of all the variables Xb coupled to the embedded variable Xa on the problem graph G1. This makes it possible to execute the embedding process of the variable Xb while efficiently canceling the reservation in the hardware graph G2, and makes it possible to effectively utilize the hard resource by reducing the reserved vertices V. In addition, more variables Xb and Xc can be embedded in the hardware graph G2 in one partial problem solution derivation process.

When the computer 3 selects an additional embedded variable X, the computer 3 selects an independent variable Xc that does not interact with the embedded variable Xa because the variable X is selected from the embedded variables Xb that have been coupled to the already embedded variable Xa. As a result, the variable X can be embedded in the hardware graph G2 while leaving the structure of the problem graph G1 which hardly performs the optimization such as frustration.

Fourth Embodiment

FIGS. 14 to 18 show additional illustrative diagrams of a fourth embodiment. In the present embodiment, a method of embedding variables when multivalued problems are expressed with the use of one-hot (one-hot) display will be described, but the same reference numerals are given to the same portions as those in embodiments described above, particularly, those of the first embodiment, and a description of the same portions will be omitted, and a description will be given focusing on portions different from those of the embodiments described above. The computer 3 has various functions as an invalidation processing unit and a conversion unit as functions realized by executing a program stored in the memory 5.

A one-hot display method has been known as a typical method for binary representation of large-scale problems using multivalued variables $S_1$ to $S_N$. Hereinafter, some or all of the variables of the multivalued variables $S_1$ to $S_N$ will be referred to as a multivalued variable $S_i$ as required. When the multivalued variables $S_1$ to $S_N$ are displayed in a one-hot manner with the use of the binary variables $x_1^{(q)}$ to $x_N^{(q)}$, the one-hot display can be realized by providing the binary variables $x_1^{(q)}$ to $x_N^{(q)}$ as many as the number of states that the respective multivalued variables $S_i$ can be obtained. In this case, q=1 to Q. Hereinafter, a part or all of the variables of the binary variables $x_i^{(q)}$ to $x_i^{(q)}$ will be referred to as a binary variable $x_i$ as required. As a simple example, an evaluation function $H_0$ of a one-dimensional Pots (Potts) model is represented in Expression (1), but the evaluation function $H_0$ is not limited to this example.

[Expression 1]

$$H_0 = -\sum_{i=1}^{N-1} J_i \delta(S_i, S_{i+1}) \quad (1)$$

$$S_i \in (1, 2, \ldots, Q)$$

(1) The evaluation function $H_0$ in Expression (1) represents an optimization problem in which one state out of the Q states from 1 to Q is selected by the multivalued variable $S_i$ such that the evaluation function $H_0$ is the smallest under the constraint that the multivalued variable $S_i$ can take Q states from 1 to Q.

Figure 14:
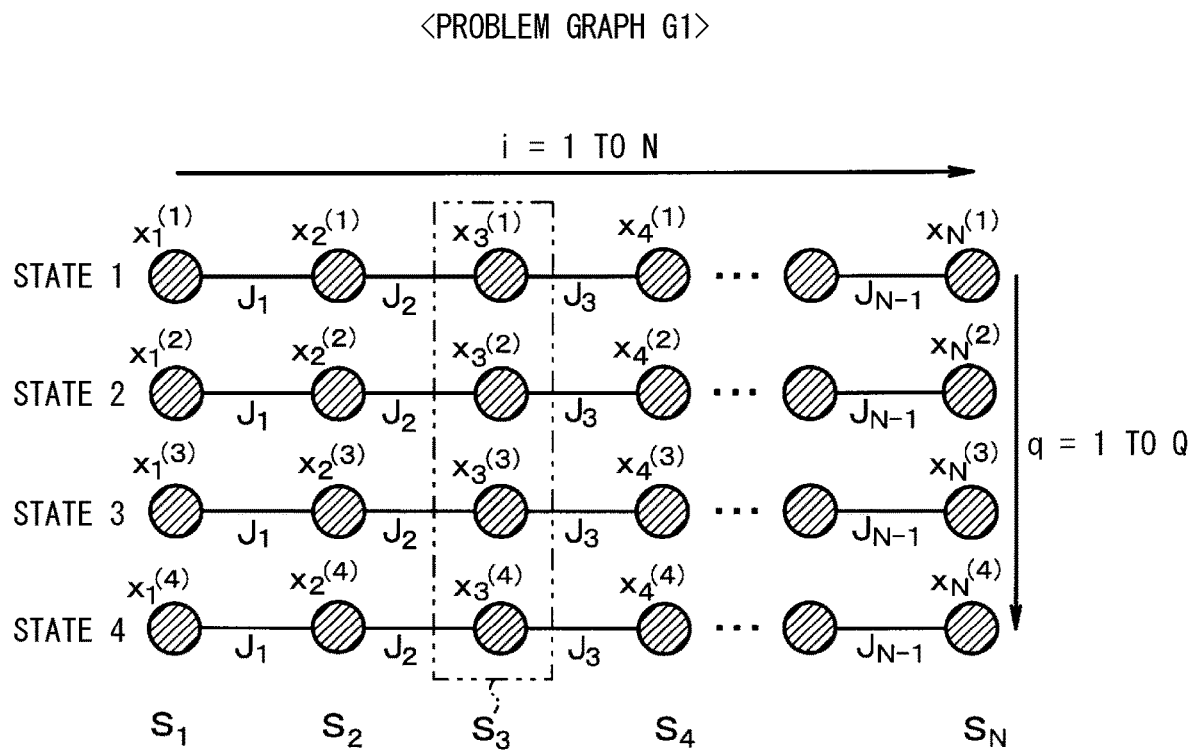
FIG. 14 is a problem graph of a multivalued problem expressed using a binary variable according to a fourth embodiment.

Expression (2) described below represents a transformation expression obtained by transforming the evaluation function $H_0$ of Expression (1) using the binary variable $x_i$ based on the one-hot constraint. FIG. 14 shows a problem graph G1 of the optimization problem related to the evaluation function $H_0$ of Expression (2). When the optimization problem related to the evaluation function $H_0$ are displayed one-hot, there are N×Q binary variables $x_i$ for expressing the evaluation function $H_0$ as shown in FIG. 14.

[Expression 2]

$$H_0 = -\sum_{i=1}^{N-1} J_i \sum_{q=1}^{Q} x_i^{(q)} x_{i+1}^{(q)} + \lambda \sum_{i=1}^{N} \left\{ \sum_{q=1}^{Q} x_i^{(q)} - 1 \right\}^2 \quad (2)$$

$$x_i^{(q)} \in (0, 1)$$

A first term on a right side of the evaluation function $H_0$ of Expression (2) is a term to be integrated when the condition that the binary variables $x_i^{(q)}$ and $x_j^{(q)}$ representing the same state q of the multivalued variable $S_i$ and $S_j$ coupled to each other in the problem graph G1 shown in FIG. 14 become a hot state value "1" is satisfied, and the first term represents a cost part of the multivalued optimization problem represented by Expression (1). In this case, j=i+1 or j=i−1. In a first term on a right side of Expression (2), when the interaction coefficient $J_i$ of the neighboring binary variables $x_i$ and $x_j$ are positive, the evaluation function $H_0$ is lowered, so that the optimization can be further performed. When the interaction coefficient $J_i$ of the first term on the right side of the Expression (2) is negative, the sign in Expression (2) may be changed so as to lower the evaluation function $H_0$. In addition, a mathematical expression may be changed so that as the evaluation function $H_0$ is higher, the optimization is more performed.

The one-hot constraint represents a constraint in which only one hot state value "1" appears in the binary variables $x_i$ representing the respective multivalued variables $S_i$ and a second term on the right side of the evaluation function $H_0$ represents this constraint. The second term on the right side of the evaluation function $H_0$ indicates a constraint term added so that the evaluation function $H_0$ becomes the lowest when only one binary variable $x_i$ is set as the hot state value "1" in each multivalued variable $S_i$. The λ of the second term on the right side of Expression (2) is a parameter representing a ratio of an influence of the first term on the right side and the second term on the right side of Expression (2), and if the parameter λ is set to be large, the influence of the second term on the right side can be increased, the constraint condition that only one binary variable $x_i$ is set to the hot state value "1" can be strengthened. Conversely, when the parameter λ is set to be small, the influence of the first term on the right side of Expression (2) can be increased.

Figure 15:
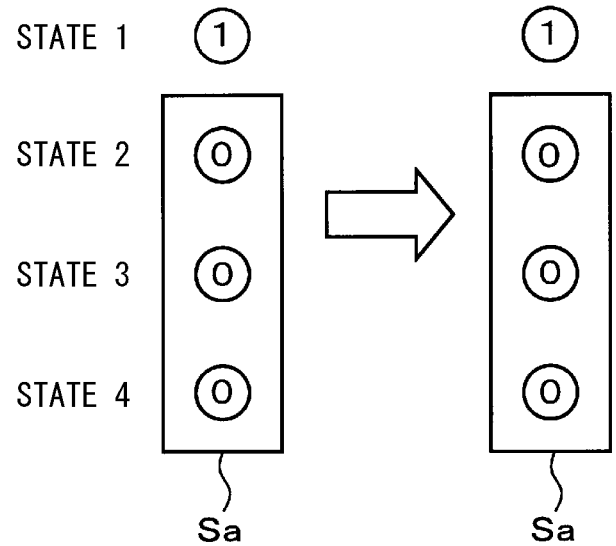
FIG. 15 is an illustrative diagram of a selection method for selecting a binary variable (Part 1)

When the partial problem of the optimization problem including the one-hot constraint is embedded in the hardware graph G2, the search for an optimal solution cannot be efficiently performed unless the partial problem is selected to include as many solutions as possible that satisfy the one-hot constraint. For example, as shown in FIG. 15, when the computer 3 partially selects the binary variable $x_i$ in which all cold state values are "0" in one multivalued variable $S_i$, there is only one solution satisfying the one-hot constraint as shown in FIG. 15. Refer to a partial selection variable Sa of the binary variable $x_i$ shown in FIG. 15. For that reason, even if the quantum ising machine 1 executes the optimization process, the optimal solution of the partial problem is fixed to the solution corresponding to the binary variable $x_i$, all of which are set to the cold state value "0". In other words, this makes it impossible to search for a better solution of the whole binary variable $x_i$.

Figure 16:
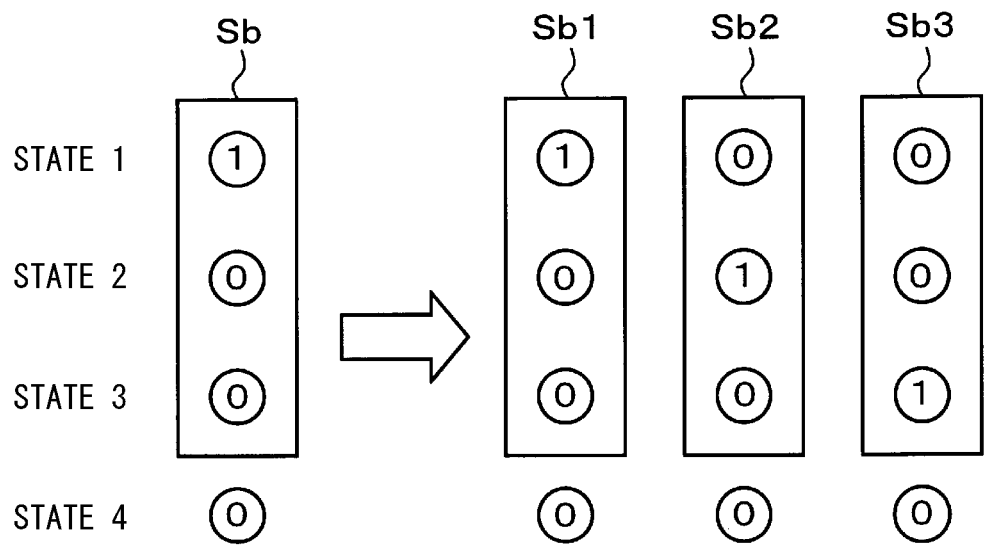
FIG. 16 is an illustrative diagram of the selection method for selecting the binary variable (Part 2)

Therefore, as shown in FIG. 16, in a series of processes in which the process of optimizing the binary variable $x_i$ is repeated, it is desirable to select partial problems so as to always include the binary variable $x_i$ whose hot state value is "1" at the time when the computer 3 refers to the binary variable $x_i$ of the multivalued variable $S_i$. The computer 3 can be configured to include a large number of states in which the partial problem satisfies the one-hot constraint by selecting the binary variable $x_i$ as the variable of the partial problem so as to include the binary variable $x_i$ having the hot state value "1". Refer to the partial selection variables Sb1 and Sb2 and Sb3 of the binary variable $x_i$ shown in FIG. 16. This makes it possible to efficiently search for a more accurate solution satisfying the one-hot constraint by optimizing the partial problem.

Figure 17:
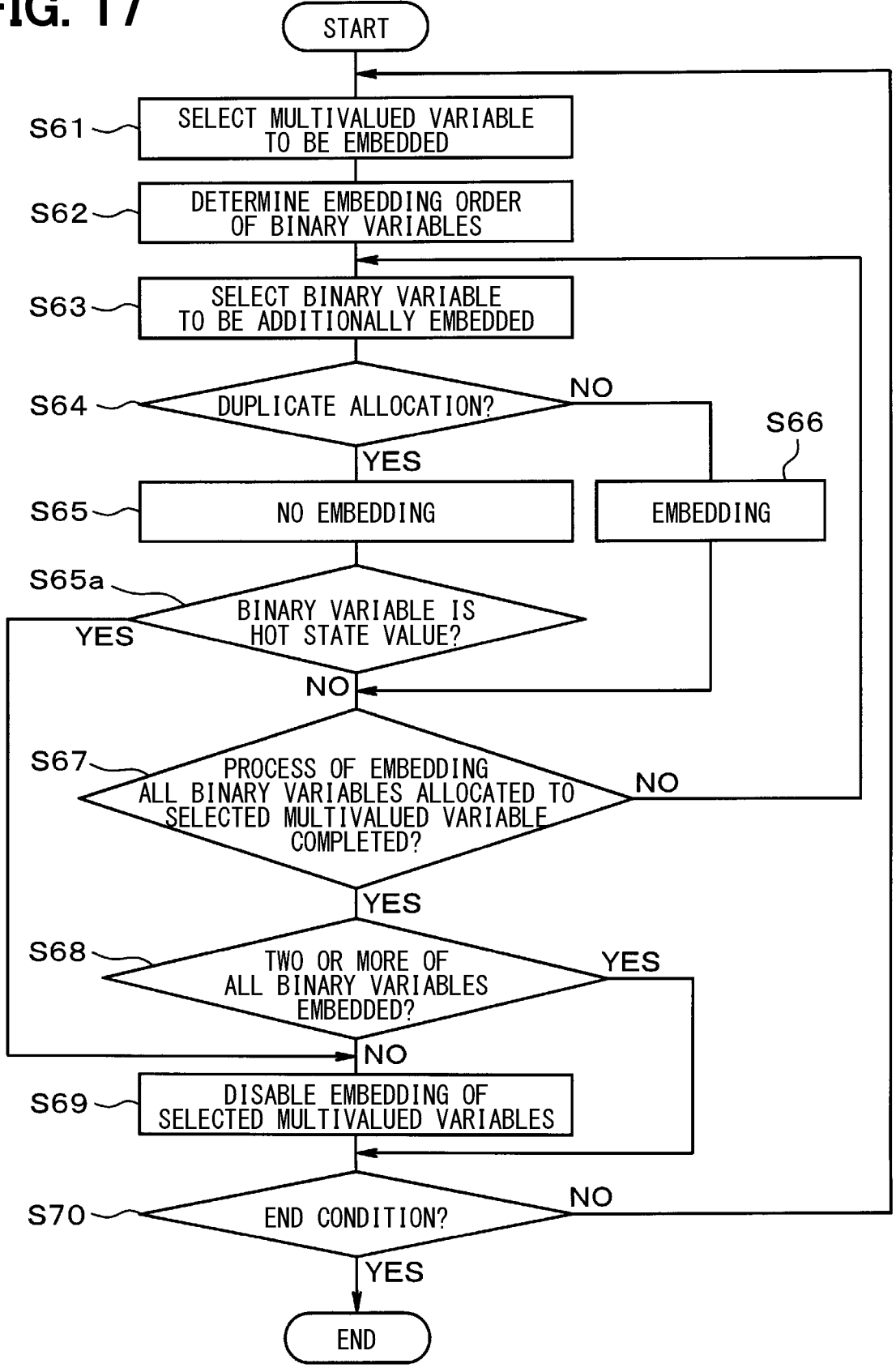
FIG. 17 is a flowchart showing a process of embedding a multivalued variable.

Referring now to FIGS. 3 and 17, the method of embedding the multivalued variable $S_i$ will be described.

First, the computer 3 enters the problem graph G1 in S1 of FIG. 3, and performs an embedding process of the binary variable $x_i$ in S2. FIG. 17 shows a flowchart of the process of embedding the binary variables $x_i$ corresponding to FIG. 4 of the embodiment described above. When the computer 3 embeds the binary variable $x_i$ in the hardware graph G2 of quantum ising machine 1, the computer 3 randomly selects one multivalued variable $S_i$ from the multivalued variable $S_1$ to $S_N$ and embeds the binary variable $x_i$ allocated to the selected multivalued variable $S_i$ (S61). In this example, an i-th multivalued variable $S_i$ is selected. The computer 3 selects the multivalued variable $S_i$ in S61, determines NO in the end condition of S70 to be described later, and returns the process to S61, and then selects the multivalued variable $S_j$, which is an unembedded multivalued variable $S_j$ (where j is i−1 or i+1) adjacently coupled to the embedded multivalued variable $S_i$ on the problem graph G1.

Since there are Q binary variables $x_i$ from 1 to Q in the i-th multivalued variable $S_i$, the computer 3 determines the embedding order of the binary variable $x_i$ with respect to the hardware graph G2 in S62. The priorities with which the computer 3 embeds the binary variables $x_i$ in the hardware graph G2 are desirably determined on the basis of the following constraints:

The binary variable $x_i$ to be first embedded by the computer 3 in the multivalued variable $S_i$ is preferably a binary variable $x_i$ adjacently coupled to the already embedded binary variable $x_j$ (where j is i−1 or i+1). The computer 3 may select the binary variable $x_i$ having the hot state value "1" as the highest priority among the binary variables $x_i$ satisfying the coupling condition, and select the binary variable $x_i$ having the cold state value "0" as the next priority.

In addition, it is desirable that the binary variable $x_i$ to be embedded in the second and subsequent multivalued variable $S_i$ by the computer 3 has the binary variable $x_i$ set to the hot state value "1" as the highest priority, and the binary variable $x_i$ set to the cold state value "0" as the next priority. The computer 3 desirably preferentially embeds the binary variable $x_i$ adjacently coupled to the embedded binary variable $x_j$ in the binary variable $x_i$ satisfying the condition of the cold state value "0", and selects the binary variable $x_j$ adjacently uncoupled from the embedded binary variable $x_i$ as the next priority. A specific example of the priority will be described later.

After selecting the binary variable $x_i$ in the priority described above in S63, the computer 3 determines whether or not a duplicate allocation occurs when the binary variable $x_i$ is embedded in the hardware graph G2 in S64. When embedding a target binary variable $x_i$ in the hardware graph G2, the computer 3 does not embed the binary variable $x_i$ in the hardware graph G2 in S65 if the duplicate allocation is required. On the other hand, if the duplicate allocation is not required, the computer 3 embeds the binary variable $x_i$ in the hardware graph G2 in S66. If the duplicate allocation is not required, the computer 3 reserves another vertex V of the hardware graph G2 with the vertex V in which the binary variable $x_i$ is embedded as a base point, as described in the above embodiment.

In this example, the computer 3 determines in S65 that the binary variable x is not to be embedded if the duplicate allocation is required when embedding the target binary variable $x_i$ in the hardware graph G2, but if the binary variable $x_i$ that is not to be embedded is the hot state value "1", it is preferable that the computer 3 invalidates, that is, cancels the embedding of the multivalued variable $S_i$ selected in S69, and the process proceeds to the process of embedding the following multivalued variable $S_j$. In other words, if the binary variable $x_i$ of the hot state value "1" cannot be embedded in the hardware graph G2, only the binary variable $x_i$ that satisfies the cold state value "0" can be embedded. As a result, the multivalued variable $S_i$ including only one state satisfying the one-hot constraint in the partial problem can be eliminated from the partial problem.

In S67, the computer 3 determines whether or not the process of embedding all the binary variables $x_i$ allocated to the multivalued variable $S_i$ selected in S61 has been completed, and repeats the processing of S63 to S66 until the process of embedding all the binary variables $x_i$ has been completed.

As a result of completing the process of embedding all the binary variables $x_i$ allocated to the selected multivalued variable $S_i$, if two or more of all the binary variables $x_i$ can be embedded, the computer 3 shifts to S70 as it is and continues the processing. However, when the binary variable $x_i$ is one or less in the selected multivalued variable $S_i$, that is, when only the binary variable $x_i$ indicating the hot state value "1" or the cold state value "0" can be embedded, the computer 3 invalidates, that is, cancels the embedding of all the selected multivalued variables $S_i$ in S69. At that time, the computer 3 cancels the reservation of the hardware resources of the quantum ising machine 1 by removing the already embedded binary variables $x_i$ from the vertex V of the hardware graph G2 and canceling the reservation of the other vertices V. This makes it possible to exclude the multivalued variable $S_i$ that does not satisfy the one-hot constraint from the variables representing the partial problems.

The computer 3 determines whether or not the end condition is satisfied in S70, and repeats the process from the point of selecting another multivalued variable $S_j$ adjacently coupled to the multivalued variable $S_i$ (where j is i−1 or i+1) until the end condition is satisfied. When the binary variable $x_j$ representing the multivalued variable $S_j$ cannot be coupled to the binary variable $x_i$ of the previously embedded multivalued variable $S_i$ on the hardware graph G2, the computer 3 determines that the end condition is satisfied in S70, and terminates the embedding of the other multivalued variable $S_j$.

Then, when the computer 3 completes the process of embedding all the multivalued variables $S_i$, the quantum ising machine 1 executes the optimization processing in S3 of FIG. 3. The quantum ising machine 1 optimizes the partial problems embedded in the optimization process with the use of a gradient method or another optimization method, and obtains the value of the binary variable $x_i$ so as to satisfy the optimization condition that the evaluation function $H_0$ is lower than a predetermined value. At that time, the quantum ising machine 1 determines and updates the optimum value of the binary variable $x_i$ on the condition that a predetermined time has elapsed since the process starts or that the process has been repeated a predetermined number of times or more of trials (S4). In that instance, the evaluation value of the evaluation function $H_0$ may be obtained with the use of a fixed value such as an optimal solution or an initial value obtained so far as another non-embeddable binary variable $x_i$. This makes it possible to solve the partial problems.

Thereafter, when the computer 3 returns the processing to S2, selects the multivalued variable $S_i$ again and embeds the multivalued variables $x_i$ in the selected multivalued variable $S_i$ in the hardware graph G2, the quantum ising machine 1 executes the optimization process by the binary variables $x_i$, determines the optimum value of the combination of the binary variables $x_i$, and updates the binary variables $x_i$ in S4. As the binary variables $x_i$ not selected at that time, it is preferable to use the optimum value of the binary variables $x_i$ obtained as the optimum value before the above processing. The binary variables $x_i$ in the multivalued variable $S_i$ that has not been selected once is preferably set to a fixed value and processed.

Then, the quantum ising machine 1 determines that the end condition is satisfied on the condition that a predetermined period of time has elapsed since the process starts or that the process has been repeated a predetermined number of times or more of trials (YES in S5), and outputs the result of the multivalued variables $S_i$ or the evaluation value of the evaluation function $H_0$. As a result, the entire optimization problem can be solved. With repetition of the processing in this manner, the original problem can be divided into the partial problems and solved.

<Specific Example of Embedding Method in Step S62>

Figure 18:
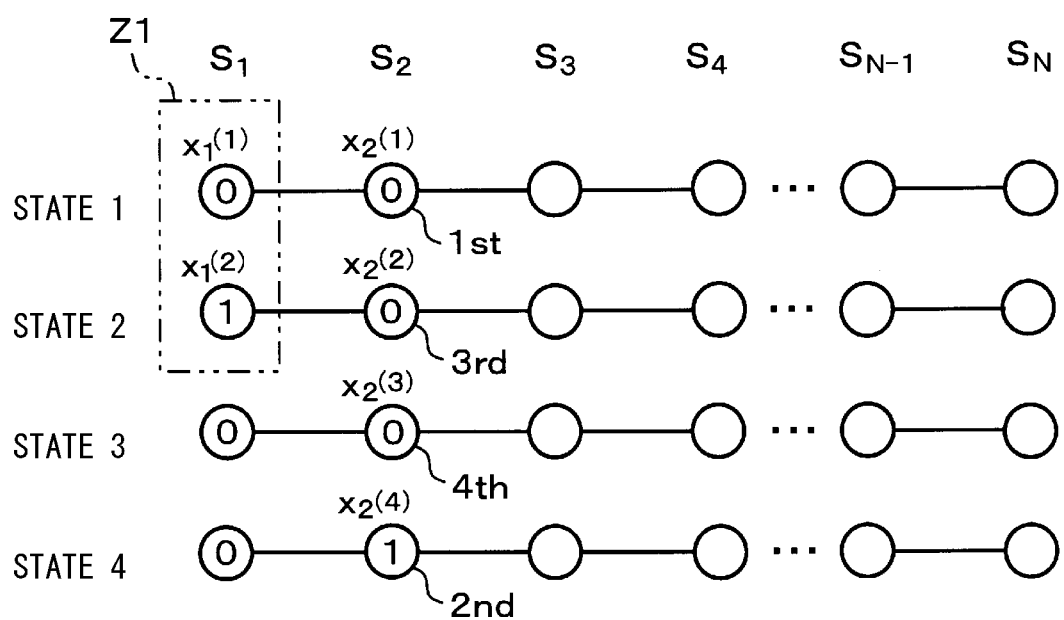
FIG. 18 is an illustrative diagram showing a selection priority order of binary variables.

Referring to FIG. 18, a specific example of Step S62 when the binary variable $x_i$ is embedded in the hardware graph G2 will be described. In this example, a simple example of Q=4 is shown. It is assumed that the computer 3 embeds the binary variables $x_1^{(1)}$ and $x_1^{(2)}$ in the multivalued variable $S_1$ in the hardware graph G2 of the quantum ising machine 1, but the duplicate allocation occurs when other binary variables $x_1^{(3)}$ and $x_1^{(4)}$ are embedded in the hardware graph G2 to disable the embedding. In FIG. 18, the binary variables $x_1^{(1)}$ and $x_1^{(2)}$, which have been embedded in the vertices V of the hardware graph G2, are denoted by "Z1".

At that time, it is assumed that the embedded binary variable $x_1^{(2)}$ has a hot state value of "1". FIG. 18 shows priorities "1st" to "4th" when the computer 3 embeds the binary variables $x_2^{(1)}$, $x_2^{(2)}$, $x_2^{(3)}$, and $x_2^{(4)}$ in the multivalued variable $S_2$ adjacently coupled to the multivalued variable $S_1$.

As described above in S62, it is desirable that the binary variable $x_2$ to be embedded first is the binary variable $x_2$ coupled to the embedded binary variable $x_1$. It is desirable that the binary variable $x_2$ having the hot state value "1" is given the highest priority among the binary variables $x_2$. In the example shown in FIG. 18, since the binary variables $x_2^{(1)}$ and $x_2^{(2)}$ coupled to the embedded binary variable $x_1$ are both cold state values "0", any one of the binary variables $x_2^{(1)}$ and $x_2^{(2)}$ may be selected, but the binary variable $x_2^{(1)}$ is randomly selected.

It is desirable that the binary variable $x_i$ having the hot state value of "1" is given the highest priority and the binary variable $x_i$ having the cold state value of "0" is given the next priority as the binary variable $x_i$ to be embedded in the second or later. In the case shown in FIG. 18, since the binary variable $x_2^{(4)}$ is set to the hot state value "1", the binary variable $x_2^{(4)}$ of the hot state value "1" is set as a second embedding target. The computer 3 preferentially embeds the binary variable $x_i$ coupled to the embedded binary variable $x_j$ among the binary variables $x_i$ satisfying the condition of the cold state value "0". For that reason, in an example shown in FIG. 18, the binary variable $x_2^{(2)}$ is set as a third embedding target. In addition, the computer 3 selects a binary variable $x_i$ which is not coupled to the embedded binary variable $x_j$ as the following priority. In the case of the example shown in FIG. 18, the binary variable $x_2^{(3)}$ is set as a final embedding target. It is desirable to embed the binary variables $x_i$ in this order.

<Overview and Effects of the Present Embodiment>

According to the present embodiment, when solving a large-scale optimization problem in which the evaluation function $H_0$ defined by the multivalued variable $S_i$ is expressed by the one-hot constraint using the binary variable $x_i$, when the partial problem variable is selected so as to include at least a part of the binary variables $x_i$ in the multivalued variables $S_i$, the variable is selected so as to include the binary variable $x_i$ having the hot state value "1" (corresponding to a first value), and embedded in the hardware graph G2. As a result, each of the multivalued variables $S_i$ includes a state satisfying the multiple one-hot constraints as a partial problem so as to be able to efficiently search for a solution with higher accuracy.

When the binary variable $x_2$ of the multivalued variable $S_2$ coupled to the previously embedded multivalued variable $S_1$ on the problem graph is additionally embedded, the computer 3 preferentially embeds the binary variable $x_2^{(1)}$ coupled to the embedded binary variable $x_1^{(1)}$ on the problem graph G1 in the binary variable $x_2$ representing the multivalued variable $S_2$. Then, a partial problem can be constructed so as to include as many interactions as possible between the multivalued variables $S_i$ and $S_j$ coupled to each other on the problem graph G1.

When the binary variable $x_2$ of the multivalued variable $S_2$ coupled to the previously embedded multivalued variable $S_1$ on the problem graph is additionally embedded, the computer 3 preferentially embeds the binary variable $x_2^{(4)}$ satisfying the condition of the hot state value "1" in the binary variable $x_2$ representing the multivalued variable $S_2$. Then, the computer 3 can preferentially embed the binary variable $x_2^{(4)}$ having the hot state value "1" in the hardware graph G2.

In addition, when the computer 3 determines that the binary variable $x_i$ designated as the hot state value "1" is non-embeddable, the computer 3 disables the embedding of the entire multivalued variable $S_i$ represented by the binary variable $x_i$ and removes the previously embedded binary variable $x_i$ from the vertex V of the hardware graph G2. This makes it possible to exclude, from the partial problems, the multivalued variable $S_i$ having only one state satisfying the one-hot constraint in the partial problems. Moreover, the computer 3 can cancel the reservation of the hardware resources of the quantum ising machine 1.

When the computer 3 determines that two or more of the binary variables $x_i$ of all the selected multivalued variables $S_i$ cannot be embedded, the computer 3 invalidates the embedding of the entire multivalued variables $S_i$ represented by the binary variables $x_i$, and removes the previously embedded binary variables $x_i$ from the vertices V of the hardware graph G2. The computer 3 can eliminate the multivalued variables $S_i$ in which both the hot state value "1" and the cold state value "0" are non-embeddable from the partial problem, and can eliminate the multivalued variable $S_i$ having only one state satisfying the one-hot constraint in the partial problem from the partial problem.

Fifth Embodiment

Figure 19:
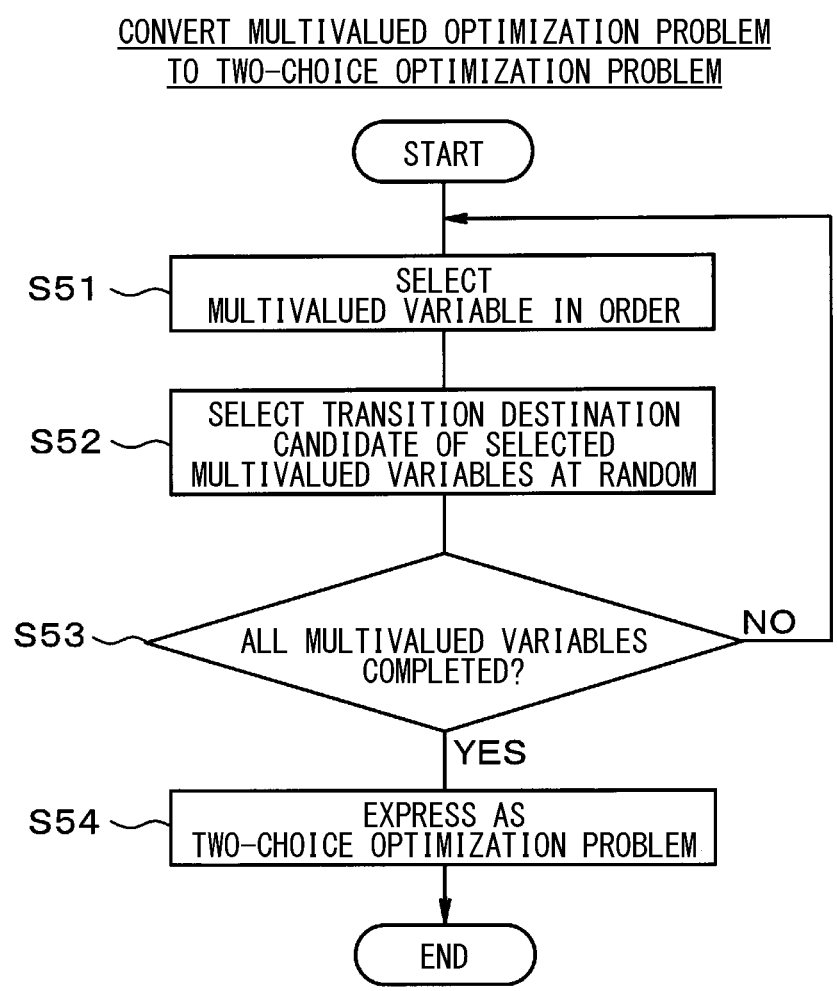
FIG. 19 is a flowchart showing a conversion process to the two-choice optimization problem according to a fifth embodiment.
Figure 20:
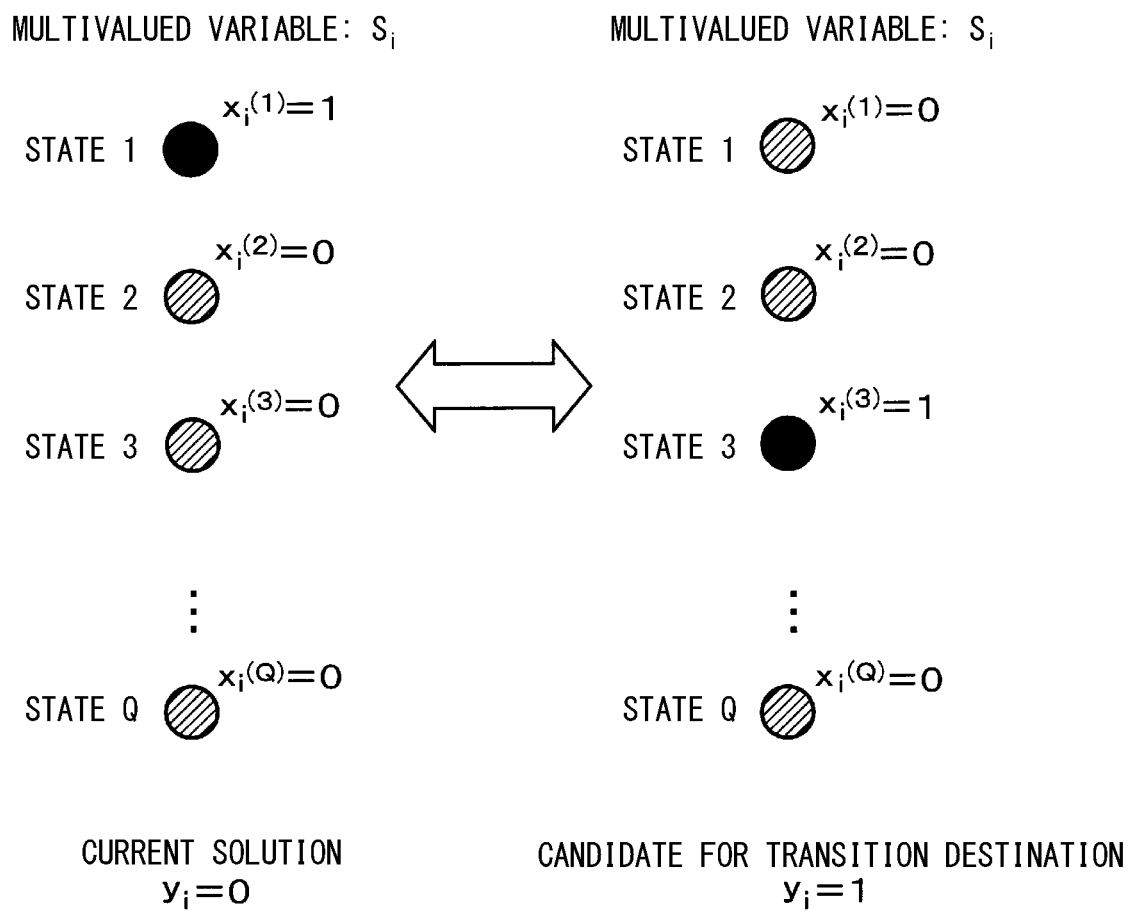
FIG. 20 is a diagram illustrating the content of a conversion process to the two-choice optimization problem.

FIGS. 19 and 20 show additional illustrative diagrams of a fifth embodiment. Although the evaluation function $H_0$ may be configured as in Expression (2) using a parameter $\lambda$, the variable definition of a ratio of the influence of a second term on the right side of Expression (2) by the parameter $\lambda$ increases the possibility that a solution in which the quantum ising machine 1 does not satisfy the one-hot constraint is derived as a solution of the entire optimization problem. In addition, since the parameter $\lambda$ is adjusted to an optimum value, there is a possibility that the calculation throughput is further increased.

When the above situation is assumed, the computer 3 may convert into a two-choice optimization problem selecting the multivalued states "1" to "Q" of the multivalued variables $S_i$ by two choices prior to implementing the partial problem on the quantum ising machine 1. The computer 3 executes the process of converting into the two-choice optimization problem in advance, so that a partial problem in which the solution of the multivalued variable $S_i$ that does not satisfy the one-hot constraint is eliminated can be implemented in the quantum ising machine 1. In that case, the constraint corresponding to the second term on the right side of Expression (2) can be eliminated, and the parameter $\lambda$ of the second term on the right side of Expression (2) does not need to be defined by a variable. The computer 3 and the quantum ising machine 1 execute the optimization process of the cost part corresponding to the first term on the right side of Expression (2), thereby being capable of obtaining the optimal solution of the binary variable $x_i$, and being capable of greatly reducing the calculation throughput.

For example, it is desirable that after converting the entire multivalued variable $S_i$ into a two-choice optimization problem for selecting whether the current multivalued states "1" to "Q" are maintained, or the current multivalued states "1" to "Q" are transited by using a procedure shown in FIG. 19, the computer 3 implements the partial problem related to the two-choice optimization problem in the quantum ising machine 1 and executes the optimization process.

As shown in FIG. 19, the computer 3 sequentially selects the multivalued variables $S_1$ to $S_N$ in S51, and randomly selects the destination candidates of the hot state value "1" in the multivalued variable $S_i$ selected in S52. The computer 3 repeats the processes of Steps S51 to S53 for all the multivalued variables $S_1$ to $S_N$, and finally, as shown in S54, can convert into a two-choice optimization problem selecting whether to maintain the current multivalued states "1" to "Q" of the multivalued variable $S_i$, or to transition the current multivalued states "1" to "Q", by two choices FIG. 20 shows a specific example. When it is assumed that the multivalued variable $S_i$ is set to the multivalued state "1" at the time of executing the process shown in FIG. 19, the computer 3 randomly selects one of the multivalued states "2" to "Q" as candidates for the transition destination. If the computer 3 selects the multivalued state "3" as the transition destination, the determination of whether the multivalued variable $S_i$ is set to the current multivalued state "1" or the multivalued state "3" as the transition destination is left to the quantum ising machine 1. As a result, the multivalued variable $S_i$ can be converted into a two-choice optimization problem of two-chose between maintenance of the current multivalued state "1" and transition to the multivalued state "3". This two-choice optimization problem is defined by the two-choice variable $y_i$, and the two-choice variable $y_i=0$ represents the maintenance and the two-choice variable $y_i=1$ represents the transition, for example.

Further, when the computer 3 recognizes that the evaluation function $H_0$ is more optimized when the multivalued variables $S_i$ and $S_j$ to be coupled to each other on the problem graph G1 are brought into the same multivalued state, it is preferable that the two-choice optimization problem be constructed so that at least one of the current multivalued state "1" of one multivalued variable $S_i$ and the multivalued state "3" of the transition destination becomes the same state as at least one of the current multivalued state of another multivalued variable $S_j$ to be coupled to one multivalued variable $S_i$ and the multivalued state of the transition destination. Then, when the quantum ising machine 1 optimizes the two-choice optimization problems, the binary variable $x_i$ for optimizing the evaluation function $H_0$ can be efficiently obtained.

In other words, when the use of the binary state value of the binary variable $x_i$ is used instead of the expression of the multivalued variable $S_i$, the binary variable $x_i$ may be selected so that the current binary state value (hot state value "1" or the cold state value "0") or the binary state value of the transition destination different from the current binary state value becomes the same as at least one of the current binary state value of the binary variable $x_j$ adjacently coupled or the binary state value of the transition destination different from the current binary state value so that the two-choice optimization problem includes the state in which the binary state value of the binary variable $x_j$ becomes the same binary state value as that of the binary variable $x_j$ coupled on the problem graph G1.

On the other hand, if the computer 3 recognizes that the evaluation function $H_0$ becomes smaller when the multivalued variables $S_i$ and $S_j$ which are adjacently coupled to each other on the problem graph G1 are in different multivalued states, it is desirable to configure the two-choice optimization problem such that one or both of the current multivalued state "1" of one multivalued variable $S_i$ or the multivalued state "3" of the transition destination become multivalued states different from both the current multivalued state of the other adjacent multivalued variable $S_j$ and the multivalued state of the transition destination. Then, when the quantum ising machine 1 optimizes the two-choice optimization problem, the binary variable $x_i$ satisfying the condition in which the evaluation function $H_0$ is optimized can be obtained with high accuracy.

In other words, when the use of the state value of the binary variable $x_i$ is used instead of the expression of the multivalued variable $S_i$, the binary variable $x_i$ may be selected so that the current binary state value (hot state value "1" or the cold state value "0") or the binary state value of the transition destination different from the current binary state value becomes different from both of the current binary state value of the binary variable $x_j$ adjacently coupled and the binary state value of the transition destination so that the two-choice optimization problem includes the binary state value of the binary variable $x_j$ which is different from the binary variable $x_j$ coupled on the problem graph G1.

The computer 3 implements the partial problem by embedding the partial problem of the two-choice optimization problem defined by the two-choice variable $y_i$ into hardware graph G2. The quantum ising machine 1 then optimizes the partial problem of the embedded two-choice optimization problem and determines the two-choice variable $y_i$. The computer 3 updates the binary variable $x_i$ with reference to the outputs of the two-choice variable $y_i$ by the quantum ising machine 1 which minimizes the partial problem, and the current binary states of the variables and the binary states of the transition destinations. The optimal solution of the entire binary variable $x_i$ can be obtained by generating the two-choice optimization problems by the computer 3 and the ising machine 1 and repeating the update process of the binary variable $x_i$.

In optimizing the multivalued variable $S_i$ of the multivalued problem, the computer 3 converts the multivalued problem into the two-choice optimization problem selecting the multivalued states "1" to "Q" by the multivalued variable $S_i$ by two choices, and then partially embeds the two-choice variable $y_i$ of the two-choice optimization problem in the vertex V of the hardware graph G2. The computer 3 executes the process of converting into the two-choice optimization problem in advance, thereby being capable of configuring the partial problem in which the solution of the multivalued variable $S_i$ that does not satisfy the one-hot constraint is eliminated, as a result of which the calculation throughput can be greatly reduced. Furthermore, since the partial problem includes only a state in which the one-hot constraint is satisfied, there is no need to adjust the parameter λ for determining the strength of the one-hot constraint. In particular, it is desirable to convert into the two-choice optimization problem that selects whether to maintain the current multivalued states "1" to "Q" (two-choice variable $y_i$=0) or to transition the current multivalued state "1" (two-choice variable $y_i$=1).

Further, when the evaluation function $H_0$ is further optimized when the multivalued variables $S_i$ and $S_j$ adjacently coupled to each other on the problem graph G1 are set to the same multivalued state, it is desirable to configure the two-choice optimization problem such that at least one of the current multivalued state of one multivalued variable $S_i$ and the multivalued state of the transition destination is set to the same state as that of the current multivalued state of adjacent other multivalued variable $S_j$ or the multivalued state of the transition destination. This allows the evaluation function $H_0$ to be more optimized when the quantum ising machine 1 optimizes the two-choice optimization problem.

In addition, when the evaluation function $H_0$ is more optimized when the multivalued variables $S_i$ and $S_j$ which are adjacently coupled to each other on the problem graph G1 are in the different multivalued states, it is desirable to configure the two-choice optimization problem such that one or both of the current multivalued state of one multivalued variable $S_i$ and the multivalued state of the transition destination becomes a multivalued state different from both of the current multivalued state of the adjacent other multivalued variable $S_j$ and the multivalued state of the transition destination. This allows the evaluation function $H_0$ to be more optimized when the quantum ising machine 1 optimizes the two-choice optimization problem.

Other Embodiments

The present disclosure is not limited to the embodiments described above, and for example, the following modifications or extensions are possible. The hardware graph G2 has been described using, but is not limited to, the chimera graph.

In the fourth embodiment, the one-hot constraint in which only one hot state value "1" (corresponding to the first value) is provided has been described as an example, but on the contrary, the present disclosure may be applied to the one-cold constraint in which only one cold state value "0" (corresponding to a first value) is provided. In the fourth embodiment, Expression (2) is exemplified as the evaluation expression of the evaluation function $H_0$, but when one-cold display is applied, it is preferable to convert the expression in the second term as in Expression (3) below.

[Expression 3]

$$H_0 = -\sum_{i=1}^{N-1} J_i \sum_{q=1}^{Q} (1-x_i^{(q)})(1-x_{i+1}^{(q)}) + \lambda \sum_{i=1}^{N} \left\{ \sum_{q=1}^{Q} x_i^{(q)} - (Q-1) \right\} \quad (3)$$

$$x_i^{(q)} \in (0, 1)$$

Any binary variable $x_i$ may be used as long as the binary variable $x_i$ can be displayed so that the first value differs from all other second values. When the multivalued variable $S_i$ is displayed in a one-hot manner, the hot state value "1" corresponds to the first value, and the cold state value "0" corresponds to the second value. When the multivalued variable $S_i$ is displayed in a one-cold manner, the cold state value "0" corresponds to the first value, and the hot state value "1" corresponds to the second value.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A variable embedding method, in which a large-scale problem is a multivalued problem applied with multivalued variables represented by binary variables limited by a constraint including a one-hot constraint or a one-cold constraint in which only one first value is different from all other second values, the variable embedding method comprising:
   embedding a two-choice variable as a variable in a vertex of a hardware graph by
      determining whether a duplicate allocation of the variables of the optimization problem to the vertices of the hardware graph is required when embedding at least a part of all the variables into the vertices of the hardware graph; and
      selecting one of the variables requiring no duplicate allocation and embedding the selected variable in one of the vertices of the hardware graph without using another one of the variables requiring the duplicate allocation as one of the variables of the partial problem,
   wherein
   a first part of all the variables requires no duplicate allocation, is able to be embedded, and is selected as one of the variables of the partial problem,
   a remaining part of all the variables requires the duplicate allocation, is unable to be embedded, and is not selected as one of the variables of the partial problem, and
   the determining whether the duplicate allocation is required includes:
      defining a vertex to which a variable is not allocated on the hardware graph as a starting point,
      defining a vertex allocated to an embedded variable adjacent to a variable to be additionally embedded as an ending point,
      checking whether a route from the starting point to the ending point is configured on the hardware graph using only an unused vertex, and
   the embedding of the two-choice variable is performed after converting into a two-choice optimization problem for selecting a multivalued state of the multivalued variable between two choices using a two-choice variable when optimizing the multivalued variable of the multivalued problem.

2. The variable embedding method according to claim 1, further comprising:
   associating the vertices of the hardware graph based on an embedding method when embedding a complete graph in the hardware graph;
   selecting at least one vertex from among partial graphs coupled over the hardware graph in which the variables are embedded when embedding the variables in the hardware graph; and
   when embedding the variables in the hardware graph, prohibiting embedding other variables other than embedding variables by reserving the vertices coupled to selected at least one vertex and increasing a coupling with the other variables in correspondence with the embedding variable based on a content of the associating.

3. The variable embedding method according to claim 2, further comprising:
   canceling the reserving of the vertices after completing a process for embedding all the variables coupled to embedded variable over the problem graph after performing the prohibiting of the embedding of the other variables.

4. The variable embedding method according to claim 2, further comprising:
   when the hardware graph is configured by a chimera graph including unit cells having a plurality of vertices along a first direction and a second direction by a plurality of grids, reserving a vertex as a second vertex corresponding to another unit cell coupled along the first direction or the second direction with a first vertex of one of the unit cells as a base point.

5. The variable embedding method according to claim 1, wherein:
   when selecting a variable to be embedded in the problem graph additionally, the variable is selected from among unembedded variables coupled to embedded variables.

6. The variable embedding method according to claim 1, wherein:
   when selecting a variable to be embedded in the problem graph additionally, and embedding a selected variable in the hardware graph,
   one of embedded variables is selected, the variable coupled to the one of embedded variables is selected, and an embedding process of the variable is completed, and then,
   another one of embedded variables is selected, and an embedding process of the variable coupled to the another one of embedded variables is performed.

7. The variable embedding method according to claim 1, wherein:
   the large-scale problem is a multivalued problem applied with multivalued variables represented by binary variables limited by a constraint including a one-hot constraint or a one-cold constraint in which only one first value is different from all other second values; and
   when selecting a variable of the partial problem to include at least a part of the binary variables among the multivalued variables and embedding in the vertices of the hardware graph, the binary variables are selected to include a binary variable corresponding to the first value, and are embedded in the vertices of the hardware graph.

8. The variable embedding method according to claim 7, wherein:
   when additionally embedding a binary variable of a multivalued variable, coupled over the problem graph to another multivalued variable on which an embedding process is already performed, in a vertex of the hardware graph, the binary variable coupled over the problem graph to an embedded binary variable or the binary variable satisfying a condition of defining as the first value is preferentially embedded among the binary variables representing the multivalued variables.

9. The variable embedding method according to claim 7, wherein:
   when a binary variable defined as the first value is determined to be non-embeddable or when two or more of the binary variables representing selected multivalued variable are determined to be non-embeddable, an entire embedding process of the multivalued variables represented by the binary variable is invalidated, and a previously embedded binary variable is removed from the partial problem.

10. The variable embedding method according to claim 1, wherein:
    in the converting into the two-choice optimization problem, the two choices include a first choice for maintaining each multivalued variable of the multivalued problem in a current multivalued state, and a second choice for transitioning each multivalued variable to another multivalued state randomly selected.

11. The variable embedding method according to claim 10, wherein:
when an evaluation function for evaluating the multivalued problem is more optimized in a case where the multivalued variables coupled over the problem graph have a same value, the two-choice optimization problem is established that at least one of the current multivalued state of one multivalued variable and another multivalued state of a transition destination is a same state as at least one of the current multivalued state of another multivalued variable coupled to the one multivalued variable and further another multivalued state of a transition destination; and
when the evaluation function is more optimized in a case where the multivalued variables coupled over the problem graph have different values, the two-choice optimization problem is established that at least one or both of the current multivalued state of the one multivalued variable and the another multivalued state of the transition destination is a different multivalued state from both of the current multivalued state of the another multivalued variable coupled to the one multivalued variable and the further another multivalued state of the transition destination.

12. A processing system in which a large-scale problem is a multivalued problem applied with multivalued variables represented by binary variables limited by a constraint including a one-hot constraint or a one-cold constraint in which only one first value is different from all other second values, the processing system comprising:
a conversion unit that converts into a two-choice optimization problem for selecting a multivalued state of the multivalued variable between two choices using a two-choice variable when optimizing the multivalued variable of the multivalued problem,
wherein:
after the conversion unit converts the multivalued problem into the two-choice optimization problem, the embedding unit embeds a two-choice variable as a variable in a vertex of a hardware graph using a sub-processing system including
a determination unit that determines whether a duplicate allocation of the variables of the optimization problem to the vertices of the hardware graph is required when embedding at least a part of all the variables into the vertices of the hardware graph; and
an embedding unit that selects one of the variables requiring no duplicate allocation and embeds selected variable in one of the vertices of the hardware graph without using another one of the variables requiring the duplicate allocation as one of the variables of the partial problem,
a first part of all the variables requires no duplicate allocation, is able to be embedded, and is selected as one of the variables of the partial problem,
a remaining part of all the variables requires the duplicate allocation, is unable to be embedded, and is not selected as one of the variables of the partial problem, and
the determining whether the duplicate allocation is required includes:
defining a vertex to which a variable is not allocated on the hardware graph as a starting point,
defining a vertex allocated to an embedded variable adjacent to a variable to be additionally embedded as an ending point, and
checking whether a route from the starting point to the ending point is configured on the hardware graph using only an unused vertex.

13. The processing system according to claim 12, further comprising:
an associating unit that associates the vertices of the hardware graph based on an embedding method when embedding a complete graph in the hardware graph;
a selection unit that selects at least one vertex from among partial graphs coupled over the hardware graph in which the variables are embedded when embedding the variables in the hardware graph; and
a prohibition unit that, when embedding the variables in the hardware graph, prohibits embedding other variables other than embedding variables by reserving the vertices coupled to selected at least one vertex and increasing a coupling with the other variables in correspondence with the embedding variable based on a content of the associating.

14. The processing system according to claim 13, further comprising:
a cancel unit that cancels the reserving of the vertices after completing a process for embedding all the variables coupled to embedded variable over the problem graph after performing the prohibiting of the embedding of the other variables.

15. The processing system according to claim 13, further comprising:
a reservation unit that, when the hardware graph is configured by a chimera graph including unit cells having a plurality of vertices along a first direction and a second direction by a plurality of grids, reserves a vertex as a second vertex corresponding to another unit cell coupled along the first direction or the second direction with a first vertex of one of the unit cells as a base point.

16. The processing system according to claim 12, wherein:
when selecting a variable to be embedded in the problem graph additionally, the variable is selected from among unembedded variables coupled to embedded variables.

17. The processing system according to claim 12, wherein:
when selecting a variable to be embedded in the problem graph additionally, and embedding a selected variable in the hardware graph,
one of embedded variables is selected, the variable coupled to the one of embedded variables is selected, and an embedding process of the variable is completed, and then,
another one of embedded variables is selected, and an embedding process of the variable coupled to the another one of embedded variables is performed.

18. The processing system according to claim 12, wherein:
the large-scale problem is a multivalued problem applied with multivalued variables represented by binary variables limited by a constraint including a one-hot constraint or a one-cold constraint in which only one first value is different from all other second values; and
when selecting a variable of the partial problem to include at least a part of the binary variables among the multivalued variables and embedding in the vertices of the hardware graph, the embedding unit selects the binary variables to include a binary variable corresponding to the first value, and embeds in the vertices of the hardware graph.

19. The processing system according to claim 18, wherein:
when additionally embedding a binary variable of a multivalued variable, coupled over the problem graph to another multivalued variable on which an embedding process is already performed, in a vertex of the hardware graph, the embedding unit preferentially embeds the binary variable coupled over the problem graph to an embedded binary variable or the binary variable satisfying a condition of defining as the first value among the binary variables representing the multivalued variables.

20. The processing system according to claim 18, further comprising:
an invalidation processing unit that, when a binary variable defined as the first value is determined to be non-embeddable or when two or more of the binary variables representing selected multivalued variable are determined to be non-embeddable, invalidates an entire embedding process of the multivalued variables represented by the binary variable, and removes a previously embedded binary variable from the partial problem.

21. The processing system according to claim 12, wherein:
when the conversion unit converts the multivalued problem into the two-choice optimization problem, the two choices include a first choice for maintaining each multivalued variable of the multivalued problem in a current multivalued state, and a second choice for transitioning each multivalued variable to another multivalued state randomly selected.

22. The processing system according to claim 21, wherein:
when an evaluation function for evaluating the multivalued problem is more optimized in a case where the multivalued variables coupled over the problem graph have a same value, the two-choice optimization problem is established that at least one of the current multivalued state of one multivalued variable and another multivalued state of a transition destination is a same state as at least one of the current multivalued state of another multivalued variable coupled to the one multivalued variable and further another multivalued state of a transition destination; and
when the evaluation function is more optimized in a case where the multivalued variables coupled over the problem graph have different values, the two-choice optimization problem is established that at least one or both of the current multivalued state of the one multivalued variable and the another multivalued state of the transition destination is a different multivalued state from both of the current multivalued state of the another multivalued variable coupled to the one multivalued variable and the further another multivalued state of the transition destination.

* * * * *